United States Patent
Jain et al.

(10) Patent No.: US 10,848,904 B2
(45) Date of Patent: *Nov. 24, 2020

(54) EFFICIENT GEO-FENCE DATA TRANSFER AND NOTIFICATIONS USING A TIME TO REACH VALUE

(71) Applicant: eBay Inc., San Jose, CA (US)

(72) Inventors: Chintan Jain, Ashburn, VA (US); Rui Kong, Lake Oswego, OR (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,410

(22) Filed: Nov. 28, 2018

(65) Prior Publication Data
US 2019/0098448 A1   Mar. 28, 2019

Related U.S. Application Data

(63) Continuation of application No. 14/473,987, filed on Aug. 29, 2014, now Pat. No. 10,171,934.

(51) Int. Cl.
| H04W 24/00 | (2009.01) |
| H04W 4/021 | (2018.01) |
| H04W 4/029 | (2018.01) |

(52) U.S. Cl.
CPC ............ *H04W 4/021* (2013.01); *H04W 4/029* (2018.02)

(58) Field of Classification Search
CPC ......... H04W 4/02; H04W 4/14; H04W 48/04; H04W 64/00
USPC ............................ 455/456.1–456.6, 457, 466
See application file for complete search history.

(56) References Cited

U.S. PATENT DOCUMENTS

| 6,681,174 B1 | 1/2004 | Harvey et al. |
| 7,647,166 B1* | 1/2010 | Kerns ................ G01C 21/3679 340/988 |
| 9,043,222 B1* | 5/2015 | Kerr ................... G06Q 30/0621 705/14.58 |
| 10,171,934 B2 | 1/2019 | Jain et al. |
| 2006/0200305 A1* | 9/2006 | Sheha .................... G01C 21/20 701/420 |
| 2007/0208492 A1 | 9/2007 | Downs et al. |
| 2012/0016577 A1 | 1/2012 | Kim et al. |
| 2012/0161958 A1* | 6/2012 | Turon ..................... G01S 19/34 340/539.3 |
| 2013/0006522 A1* | 1/2013 | Vellaikal ............ G06Q 30/0266 701/426 |
| 2013/0217411 A1 | 8/2013 | Croy et al. |

(Continued)

OTHER PUBLICATIONS

Non-Final Office Action received for U.S. Appl. No. 14/473,987, dated Nov. 27, 2015, 20 pages.

(Continued)

*Primary Examiner* — Matthew W Genack
(74) *Attorney, Agent, or Firm* — Schwegman Lundberg & Woessner, P.A.

(57) ABSTRACT

A system and method for using time to reach determinations to improve the usability of geo-fences is disclosed. A computer system accesses a current location of a client system and identifies one or more nearby geo-fences. The computer system then calculates the time to reach each of these geo-fences. If the calculated time to reach value for a particular geo-fence is within the notification range associated with that geo-fence, then the computer system generates a notification to display to a user.

15 Claims, 14 Drawing Sheets

(56) References Cited

U.S. PATENT DOCUMENTS

| | | | |
|---|---|---|---|
| 2013/0218463 A1* | 8/2013 | Howard | G01C 21/3682 |
| | | | 701/533 |
| 2013/0295970 A1 | 11/2013 | Sheshadri et al. | |
| 2014/0098060 A1* | 4/2014 | McQuade | G06F 3/045 |
| | | | 345/174 |
| 2015/0112808 A1 | 4/2015 | Coatney et al. | |
| 2015/0281889 A1 | 10/2015 | Menendez | |
| 2016/0033289 A1* | 2/2016 | Tuukkanen | G01C 21/3415 |
| | | | 701/522 |
| 2016/0066141 A1 | 3/2016 | Jain et al. | |

OTHER PUBLICATIONS

Response to Non-Final Office Action filed on Mar. 28, 2016 for U.S. Appl. No. 14/473,987, dated Nov. 27, 2015, 14 pages.
Final Office Action received for U.S. Appl. No. 14/473,987, dated Jul. 14, 2016, 23 pages.
Response to Final Office Action filed on Dec. 14, 2016 for U.S. Appl. No. 14/473,987, dated Jul. 14, 2016, 11 pages.
Non-Final Office Action received for U.S. Appl. No. 14/473,987, dated Jan. 13, 2017, 31 pages.
Response to Non-Final Office Action filed on May 10, 2017 for U.S. Appl. No. 14/473,987, dated Jan. 13, 2017, 13 pages.
Applicant Initiated Interview Summary received for U.S. Appl. No. 14/473,987, dated May 10, 2017, 3 pages.
Final Office Action received for U.S. Appl. No. 14/473,987, dated Aug. 7, 2017, 41 pages.
Response to Final Office Action filed on Nov. 7, 2017 for U.S. Appl. No. 14/473,987, dated Aug. 7, 2017, 14 pages.
Examiner Interview Summary dated Aug. 27, 2018, for U.S. Appl. No. 14/473,987, 2 pages.
Notice of Allowance received for U.S. Appl. No. 14/473,987, dated Aug. 27, 2018, 16 pages.
U.S. Appl. No. 14/473,987, U.S. Pat. No. 10,171,934, filed Aug. 29, 2014, Efficient Geo-Fence Data Transfer and Notifications Using a Time to Reach Value.

* cited by examiner

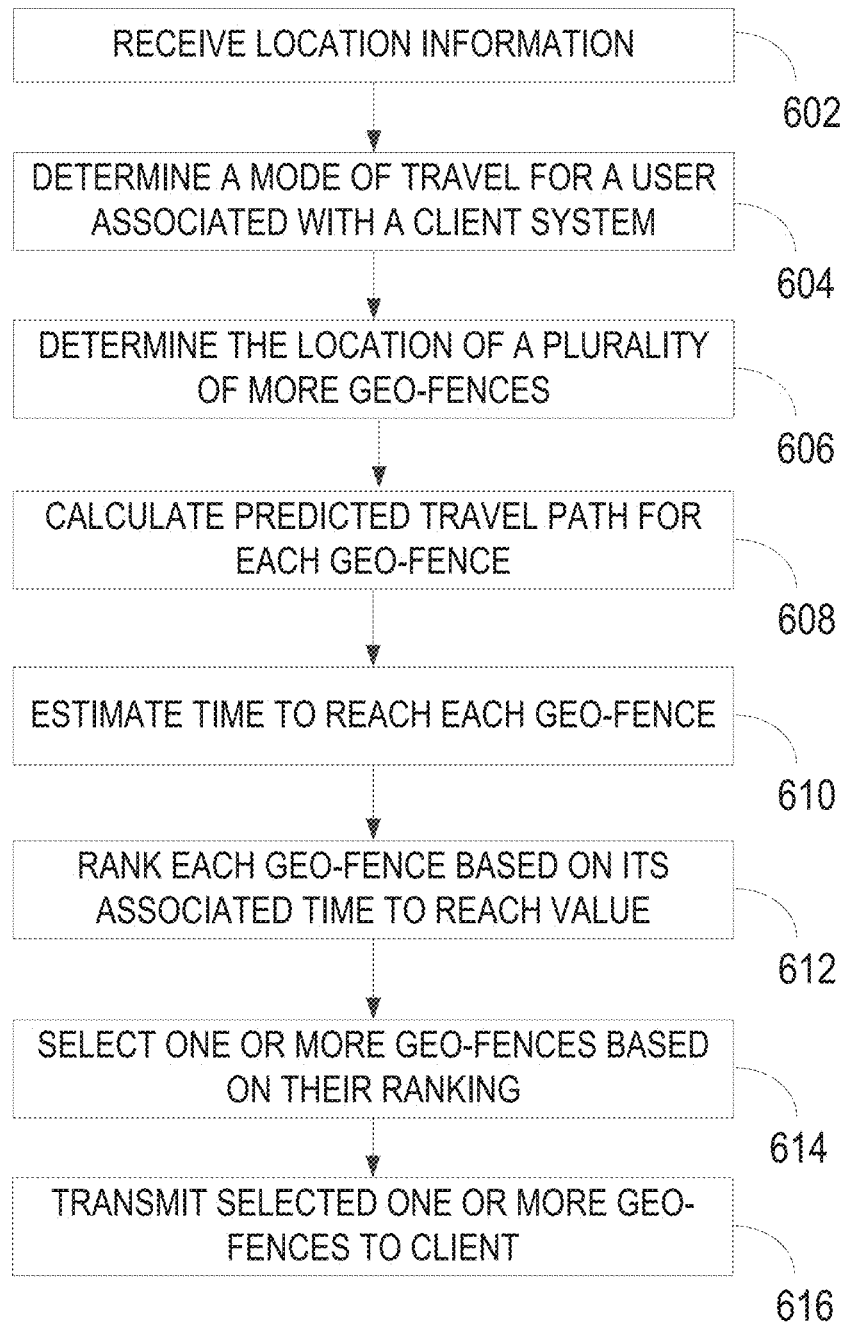
FIGURE 6    600

EFFICIENT GEO-FENCE DATA TRANSFER AND NOTIFICATIONS USING A TIME TO REACH VALUE

CLAIM OF PRIORITY

This Application is a Continuation of U.S. application Ser. No. 14/473,987, filed Aug. 29, 2014, which is hereby incorporated by reference in its entirety.

TECHNICAL FIELD

This application relates generally to the field of electronic devices and, in a specific example implementation, providing location based services.

BACKGROUND

The rise in electronic and digital device technology has rapidly changed the way society interacts with media and consumer goods and services. Digital technology enables the sale and use of a variety of consumer devices that are flexible and relatively cheap. Specifically, modern electronic devices, such as smart phones and tablets, allow a user to have access to a variety of useful applications even when away from a traditional computer.

BRIEF DESCRIPTION OF THE DRAWINGS

The present description is illustrated by way of example, and not by way of limitation, in the figures of the accompanying drawings, in which:

FIG. 6 is a flow diagram illustrating a process for enabling a smart watch system to dynamically add or remove link components, in accordance with some implementations.

Like reference numerals refer to corresponding parts throughout the drawings.

DETAILED DESCRIPTION

Figure 1:
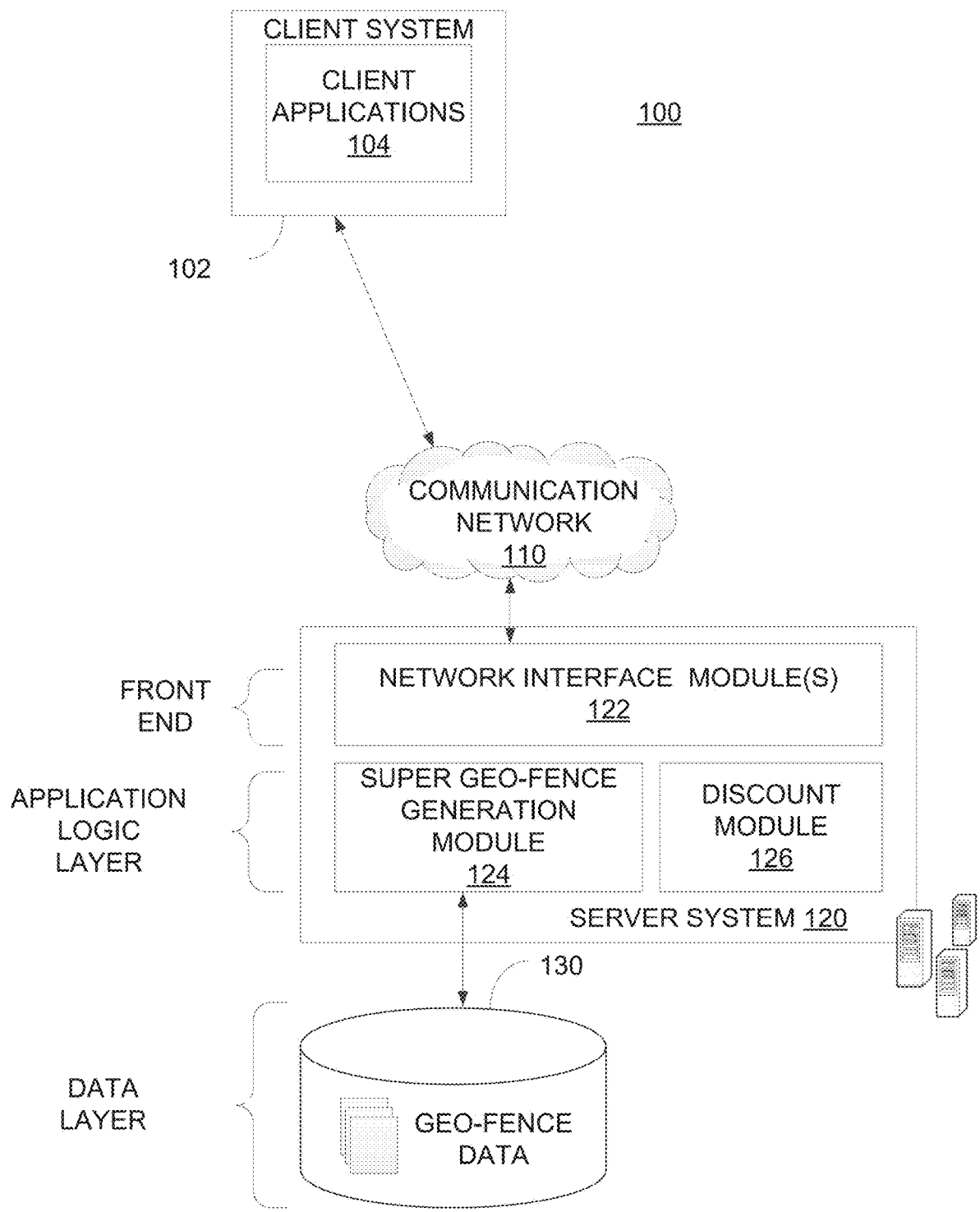
FIG. 1 is a block diagram illustrating a client-server system that includes one or more client systems and a server system, in accordance with some embodiments.

Although the implementations have been described with reference to specific example implementations, it will be evident that various modifications and changes may be made to these implementations without departing from the broader spirit and scope of the description. Accordingly, the specification and drawings are to be regarded in an illustrative rather than a restrictive sense.

In various implementations, methods and systems for efficiently transferring geo-fence data and notifications using a time to reach determination are disclosed. A server system stores a plurality of geo-fences. Each geo-fence has an associated location and defined boundaries. For example, some geo-fences are defined by a particular point (e.g., particular Global Positioning System (GPS) coordinates) and a radius distance. Any point within the radius distance from the particular point is within the geo-fence and all other points are outside the geo-fence. Other geo-fences can be in any shape and have specific boundaries defined (e.g., by establishing the vertices of the shape.)

A client system (e.g., a smart phone) tracks its own location using a GPS module or other appropriate location determining device. In some example embodiments, the location is transmitted to the server system and the server system determines when the client device crosses the boundary of one of the plurality of stored geo-fences. In other embodiments, the server system selects one or more geo-fences that are currently close to the location associated with the client device and transmits them to the client system. The client system then determines whether the client device has crossed any geo-fences. The client system then sends a notification to the server system that a geo-fence boundary has been crossed.

In some example embodiments, the client device generates a notification for the user of the client device when the user is within a specified distance from a geo-fence. For example, if the geo-fence represents the location of a restaurant, the client system generates a notification that the user is approaching the restaurant. In this way, the user has enough time to respond to the notification.

In some example embodiments, the server system (or the client system) calculates a time to reach for the geo-fence. The time to reach is an estimate of when the user (and the associated device) will cross the geo-fence. The server system first determines a route the device will take from its current position to the boundary of the geo-fence. The server system then calculates the distance needed and the rate of travel. Based on these factors, the server system can determine an estimated time to reach a boundary of the geo-fence.

The server system then determines when the time to reach has reached a specific amount of time (e.g., two minutes), and when the time to reach matches the specific amount of time, the server system sends a notification to the client system for display to the user.

In some example embodiments, the server system sends one or more geo-fences for storage on a client system. In some example embodiments, the server system sends a predetermined number of geo-fences at a time to minimize the amount of bandwidth used transferring geo-fence data. For example, some client systems store ten geo-fences at a time. The server system selects the one or more geo-fences based on the current location of the client device and the time to reach the plurality of geo-fences stored at the server system.

FIG. 1 is a block diagram illustrating a client-server system 100 that includes one or more client systems 102 and a server system 120. One or more communication networks 110 interconnect these components. The communication network 110 may be any of a variety of networks, including local area networks (LAN), wide area networks (WAN), wireless networks, wired networks, the Internet, personal area networks (PAN), or a combination of such networks.

In some example embodiments, a client system 102 is an electronic device, such as a personal computer (PC), a laptop, a smartphone, a tablet, a mobile phone, a wearable computing device, or any other electronic device capable of communication over the communication network 110. Some client systems 102 include one or more client applications 104, which are executed by the client system 102. In some example embodiments, the client application(s) 104 include one or more applications from a set consisting of search applications, communication applications, productivity applications, storage applications, word processing applications, travel applications, or any other useful applications. The client system 102 uses the client applications 104 to communicate with the server system 120 and transmit data to, and receive data from, the server system 120.

In some example embodiments, as shown by way of example in FIG. 1, the server system 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three component type of architecture, the various example embodiments are by no means limited to this architecture.

As shown by way of example in FIG. 1, the server system 120 includes a network interface module (e.g., a web server) 122, which receives data from various client systems 102, and communicates data back to the appropriate client systems 102 when appropriate. For example, the network interface module(s) 122 receives a geo-fence data request from a client system 102 and transmits the geo-fence data request to a time to reach module 124. The time to reach module 124 then accesses the geo-fence database to determine one or more geo-fences with the lowest time to reach to transmit to the client system 102. The network interface 122 then transmits the geo-fence data associated with the determined one or more geo-fences to the requesting client system 102.

As shown by way of example in FIG. 1, the data components include a geo-fence database 130 for storing data associated with each geo-fence in a plurality of geo-fences. The terms database, data, dataset, and data storage are used interchangeably in the specification to refer data that may or may not be stored in a specific database depending on the exact configuration used in a particular embodiment. Geo-fence data includes, but is not limited to, a geographic location of a geo-fence, a user or entity associated with the geo-fence (e.g., a corporation who owns a store at a particular location), time data for a geo-fence (e.g., the geo-fence is only active during hours that the restaurant is open), and geo-fence profile information.

The application logic components include a time to reach module 124 and a notification module. The time to reach module 124 calculates an estimate time needed to travel from the current location associated with a particular client system (e.g., a smart phone) to at least one boundary of a respective geo-fence.

An estimated time to reach is calculated by the time to reach module 124 by first determining the mode of travel for the user associated with the respective client system (e.g., system 102 in FIG. 1). The mode of travel can be determined based on user profile information stored about the user (e.g., user preferred mode of travel), speed and location data received from the respective client system (e.g., system 102 in FIG. 1) (e.g., how fast the user is travelling and the path they are taking), time and date information, and other factors. For example, if the server system (e.g., system 120 in FIG. 1) determines that the user is travelling at a speed of 1-3 miles per hour through a public park without roads on a Saturday afternoon, the server system (e.g., system 120 in FIG. 1) may determine that the user is walking. In another example, if the user is travelling at 75 miles per hour down a major highway, the server system (e.g., system 120 in FIG. 1) determines that the user is traveling by car.

Once the server system (e.g., system 120 in FIG. 1) has determined a mode of transportation, the server system (e.g., system 120 in FIG. 1) can then determine the most likely route from the current location of the respective client system (e.g., system 102 in FIG. 1) and at least one boundary of the respective geo-fence. For example, in some cases the most likely route is a direct route between the two points. This is especially likely if there are no obstacles between the points. However, often the mode of travel and various obstacles result in a likely path that is not a direct line between the two points. Instead, the user might have to avoid an obstacle (e.g., a river with only one nearby bridge) or need to follow a certain path (e.g., a car needs to follow a road). Thus, the server system (e.g., system 120 in FIG. 1) plots a path taking these considerations into account. The server system (e.g., system 120 in FIG. 1) might also take into account information about the user's past habits (e.g., if the user habitually comes home from work on a particular path).

Once the server system (e.g., system 120 in FIG. 1) has determined a most likely route home, the system determines the total distance travelled. For example, the server system (e.g., system 120 in FIG. 1) adds up all the legs of the planned route to determine the total distance traveled. The server system (e.g., system 120 in FIG. 1) can then estimate the travel time needed to travel the planned route. In some example embodiments, the estimated travel time is based on the determined mode of travel. For example, if the total distance of the route is 10 miles and the determined mode of travel is a car going 60 miles per hour, the server system (e.g., system 120 in FIG. 1) determines the user will arrive at the boundary of the geo-fence in six minutes. However, if the determined mode of travel is walking (e.g., 2 miles per hour), then the server system (e.g., system 120 in FIG. 1) determines that the user will arrive at the boundary of the geo-fence in five hours.

Once the time to reach module 124 determines the time to reach for one or more geo-fences, it determines whether any of the calculated time to reach values are at or below a predetermined time. For example, the time to reach module 124 determines whether any of the calculated time to reach values are less than or equal to two minutes. In this way, the time to reach module 124 can send a notification to the user when the client system 102 gets within a certain time to reach of a particular geo-fence.

In other embodiments the time to reach module 124 generates a notification based on the pathway calculated to a particular geo-fence. For example, if the time to reach module 124 determines that a car is travelling on a highway and that geo-fence A can only be reached if the user takes exit Z, the time to reach module 124 will notify the user of the geo-fence prior to reaching the exit, thus allowing the user time to decide whether to take the exit.

In other embodiments a geo-fence has a central point (e.g., a store around which the geo-fence is set up) and a radius that is determined by the user or organization that set up the geo-fence. Generally, the boundaries for the geo-fence are set up in a circle around the central point at a distance equal to the radius (e.g., 1 mile). However, In some example embodiments the time to reach module 124 can use time to reach values to set the boundaries for the geo-fence such that it exists at a travel distance (based on actual travel paths) to the central point. Thus, instead of a boundary established in a uniform circle at a fixed distance around a central point, the time to reach module 124 determines boundaries based on the travel path (or predicted travel path) of the user such that they will be determined to cross the boundary when the total distance to travel before reaching the central point is equal to the fixed distance (e.g., 1 mile).

In some example embodiments, a geo-fence data module 126 selects one or more geo-fences (or data associated with a geo-fence) to transmit to a client system 102. Some client systems (e.g., a smart phone) include a fixed amount of space (e.g., memory) to store geo-fence data. For example, some smartphones store up to ten geo-fences at a time. To ensure that the limited number of spaces that are available are used to store the most relevant geo-fences and to reduce the amount of bandwidth needed to transfer data to the client system 102, the geo-fence data module 126 selects a plurality of geo-fences that are most relevant and transmits them to the client system 102 at once.

The geo-fence data module 126 determines which geo-fences are the most relevant (e.g., the geo-fences that should be sent to the client system 102 currently) based on the time to reach each data fence. As noted above, the time to reach module 124 calculates a time to reach value for each potential geo-fence. The geo-fence data module 126 determines, for a given client device, a predetermined number of geo-fences with the shortest time to reach values. For example, if a given device can store data for ten geo-fences, the geo-fence data module 126 selects the ten geo-fences with the smallest time to reach values.

In some example embodiments, the geo-fence data module 126 uses one of the allocated geo-fence spots to construct a super geo-fence that encompasses all other selected geo-fences (e.g., the other geo-fences that are selected to send to the client system 102). In some example embodiments, this conglomeration of geo-fences (e.g., a super geo-fence) is made as large as possible without including geo-fences that were not among the geo-fences selected to transmit to the client system 120. In other embodiments, the super geo-fence is only large enough to encompass the selected geo-fences. In some example embodiments, the super geo-fence allows the client device to know when to request additional geo-fence data. For example, if the client system 102 hits a super geo-fence boundary, it automatically sends a notification to the server system (e.g., system 120 in FIG. 1). If the server system (e.g., system 120 in FIG. 1) determines that the notification indicates the client system 120 is leaving the super geo-fence, the server system (e.g., system 120 in FIG. 1) then uses the geo-fence data module 126 to select new geo-fence data to send to the client system 102.

In some example embodiments, the geo-fence data module 126 only transmits new geo-fence data to a client system 102 when the client system 102 requests that additional geo-fence data be sent. In some example embodiments, a request is generated in response to an explicit request of the user of the client system 102. In other embodiments, requests for new geo-fence data are generated automatically by the client system 102 in response to the client device determining that new geo-fence data is required. In some examples, the client system 102 determines additional geo-fence data is required based on a determination that a specific geo-fence boundary has been crossed (e.g., a super geo-fence or the geo-fence that was the farthest away when the last set of geo-fence data was received) or that the current location of the client system 102 is far enough away from any currently stored geo-fences that new data is required (e.g., if none of the currently stored geo-fences are within 10 miles).

In some example embodiments, the geo-fence data module 126 selects relevant geo-fences based on a predicted travel path. In this way, the geo-fences that a user has already passed are less likely to be chosen, while geo-fences near a predicted travel path are more likely to be selected. For example, the server system (e.g., system 120 in FIG. 1) determines (e.g., through GPS data recorded by the client device and map data) that a user is travelling along a particular highway. The geo-fence data module 126 determines that the user is unlikely to turn around and visit geo-fences that are behind the user or are only accessible from exits the user has already passed and thus can ignore or discount these geo-fences. The geo-fence data module 126 can then identify geo-fences on or near the highway in front of the user and prioritize them for selection. In some example embodiments, the geo-fence data module 126 can also determine how likely the user is to take particular exit (based either on the past history of the user or on overall data derived from all users of the server system (e.g., system 120 in FIG. 1)). Then geo-fences that are associated with particular exits can be weighted based on the calculated likelihood. In all these cases the server system (e.g., system 120 in FIG. 1) can request new geo-fence data if and when the user's actual travel path diverges from the predicted travel path.

The server system (e.g., system 120 in FIG. 1) is connected to a geo-fence data storage 130 that stores data associated with one or more geo-fences including the location of the geo-fence, the location of the boundaries, and any predetermined notification range data. In some example embodiments certain geo-fences are only active during specific time (e.g., when a store is open or when a specific sale is being offered). In this case, the geo-fence data also includes information detailing when the geo-fence should be active (e.g., when a user should be notified) and when it should not be active.

Figure 2:
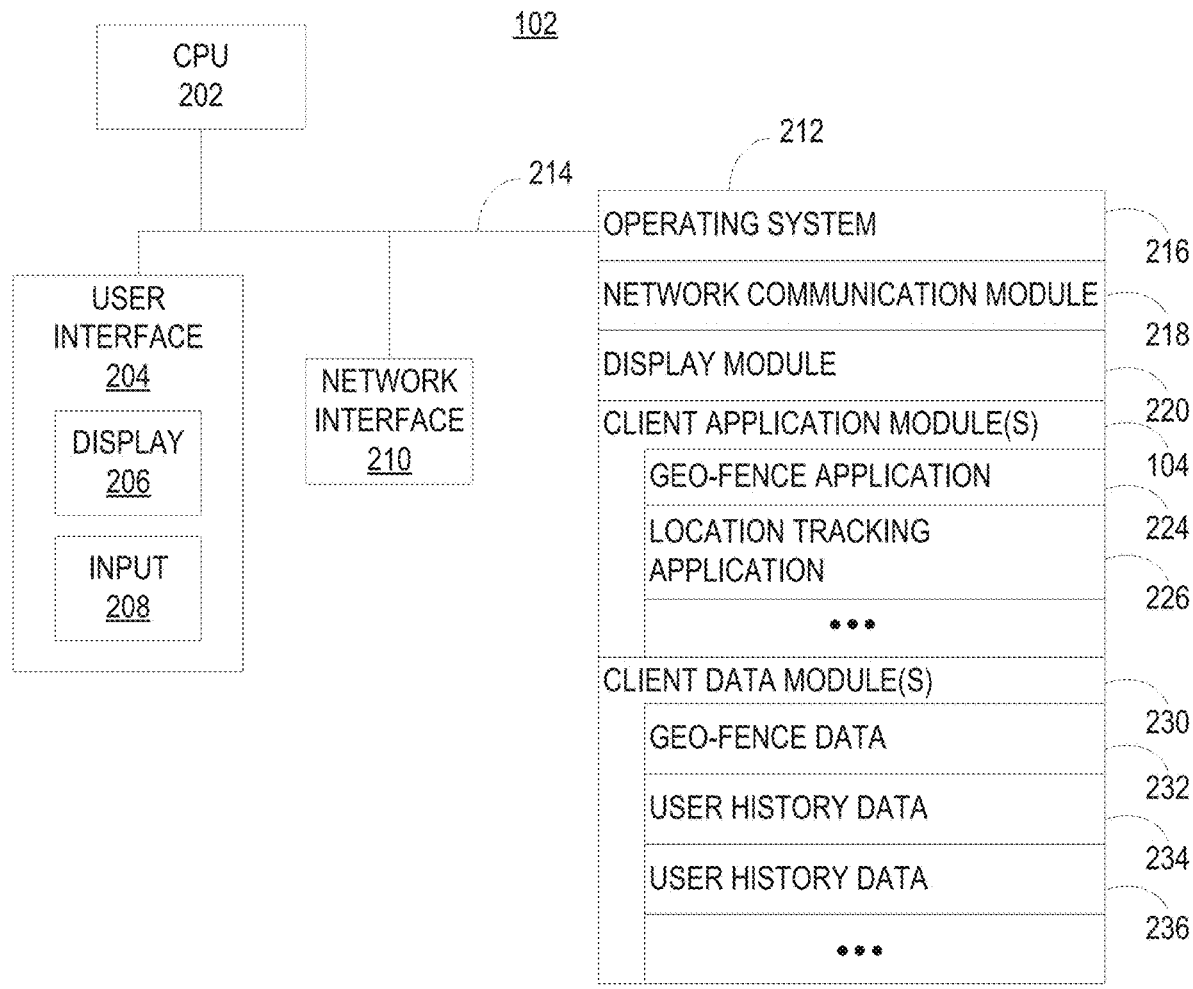
FIG. 2 is a block diagram illustrating a client system 102, in accordance with some embodiments.

FIG. 2 is a block diagram illustrating a client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems use a microphone and voice recognition to supplement or replace the keyboard.

Memory 212 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some example embodiments, memory 212 or the computer readable storage medium of memory 212, stores the following programs, modules, and data structures, or a subset thereof:
- an operating system 216 that includes procedures for handling various basic system services and for performing hardware dependent tasks;
- a network communication module 218 used for connecting the client system 102 to other computers via the one or more communication network interfaces 210 (wired or wireless) and one or more communication networks (e.g., communication network 110 of FIG. 1), such as the Internet, other WANs, LANs metropolitan area networks (MANs0), etc.;
- a display module 220 for enabling the information generated by the operating system 216 to be presented visually as needed;
- one or more client applications 104 for handling various aspects of requesting and receiving numbers, including but not limited to:
  - a geo-fence application 224 for comparing the current location of the client system 102 with the geo-fence boundaries stored in geo-fence data 232 and, in accordance with a determination that a boundary has been crossed, sending a notification either for display to a user or to a server system (e.g., system 120 in FIG. 1); and
  - a location tracking application 226 for determining the current location of the client system 102 using a GPS system or other appropriate device or system; and
- client system data module(s) 230 for storing data at the client system 102, including but not limited to:
  - geo-fence data 232 including data that describes the location and boundaries of one or more geo-fences;
  - user history data 234 including data about past travel history of a user including locations traveled to, mode of travel, path chosen, speed of travel, geo-fences encountered, and any other information about a user's past history with the server system (e.g., system 120 in FIG. 1); and
  - user profile data 236 including profile data regarding the user associated with the client system 102 including, but not limited to, demographic information about the user, user interest information, user history information, and any other information regarding the user.

Figure 3:
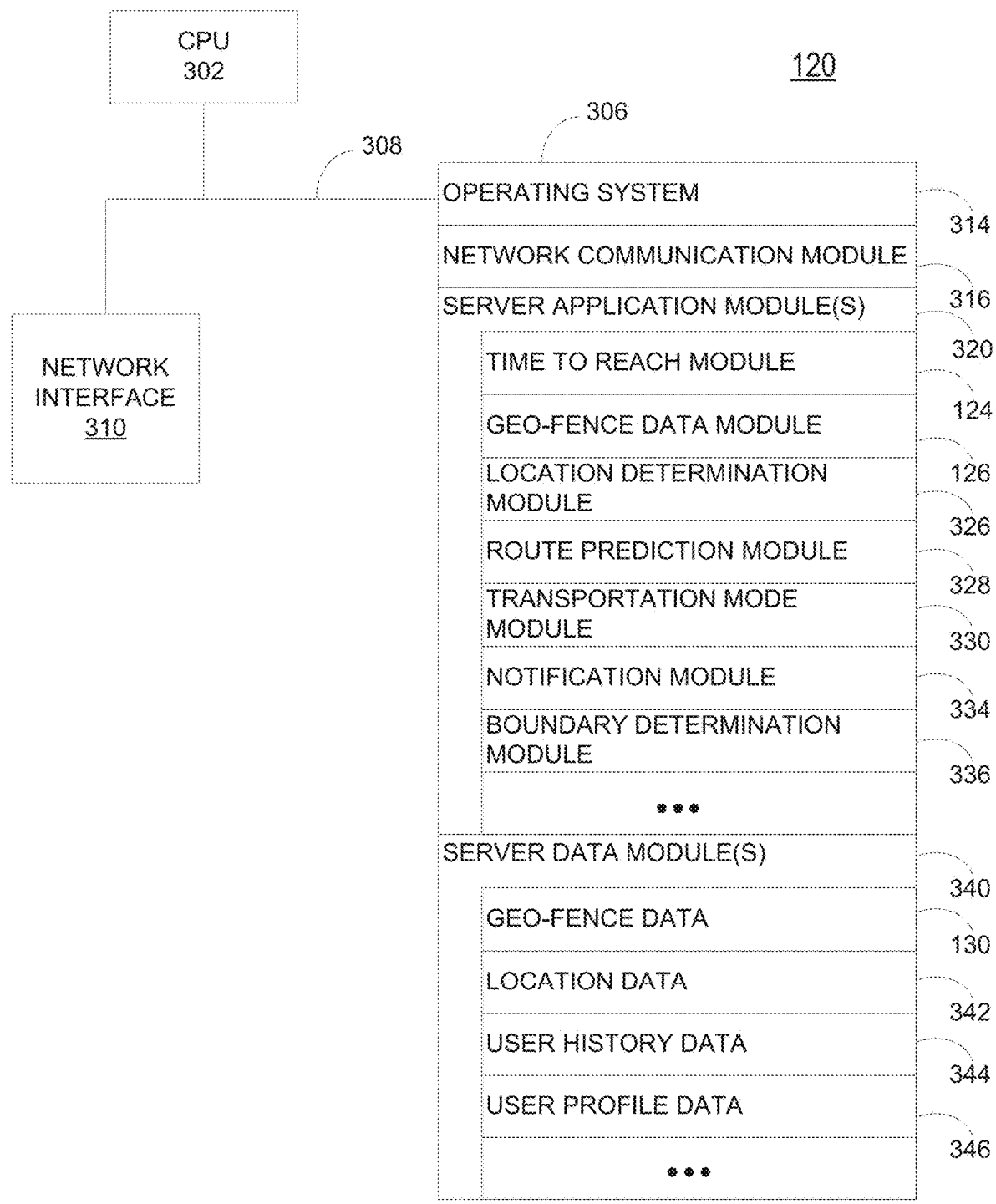
FIG. 3 is a block diagram illustrating a server system, in accordance with some embodiments.

FIG. 3 is a block diagram illustrating a server system 120, in accordance with some embodiments. The server system 120 typically includes one or more central processing units (CPUs) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some embodiments, memory 306 or the computer readable storage medium of memory 306 stores the following programs, modules, and data structures, or a subset thereof:
- an operating system 314 that includes procedures for handling various basic system services and for performing hardware dependent tasks;
- a network communication module 316 that is used for connecting the server system 120 to other computers via the one or more communication network interfaces 310 (wired or wireless) and one or more communication networks, such as the Internet, other WANs, LANS, MANs, and so on;
- one or more server application modules 320 for performing the services offered by server system 120, including but not limited to:
  - a time to reach module 124 for determining an estimated time needed to reach at least one boundary of a respective geo-fence;
  - a geo-fence data module 126 for selecting data associated with one or more geo-fences to transmit to a client system (e.g., system 102 in FIG. 1);
  - a location determination module 326 for determining a current location of one or more client systems (e.g., system 102 in FIG. 1);
  - a route prediction module 328 for determining a predicted route for a user based on current position, current speed, user history for a given user, and compiled user history for all the users of the server system (e.g., system 120 in FIG. 1);
  - a transportation mode module 330 for determining the mode of transportation currently being used by a user of a client system (e.g., system 102 in FIG. 1) based on the user's location, speed, and profile data 342;
  - a notification module 334 for notifying a user or the server system (e.g., system 120 in FIG. 1) when the user comes within a predetermined distance or time to reach of one or more boundaries of a geo-fence;
  - a boundary determination module 336 for determining whether a client system (e.g., system 102 in FIG. 1) has crossed a boundary for a respective geo-fence and determining whether the client system (e.g., system 102 in FIG. 1) is entering or leaving the geo-fence; and
- server data module(s) 340, holding data related to server system 120, including but not limited to:
  - geo-fence data 130 including location and size data for a plurality of geo-fences;

location data 342 including location and position information for one or more client systems (e.g., system 102 in FIG. 1);

user history data 344 including data about past travel history of one or more users including locations traveled to, mode of travel, path chosen, speed of travel, geo-fences encountered and any other information about a user's past history with the server system 120; and user profile data 346 including profile data regarding the user associated with the client system 102 including, but not limited to, demographic information about the user, user interest information, user history information, and any other information regarding the user.

Figure 4A:
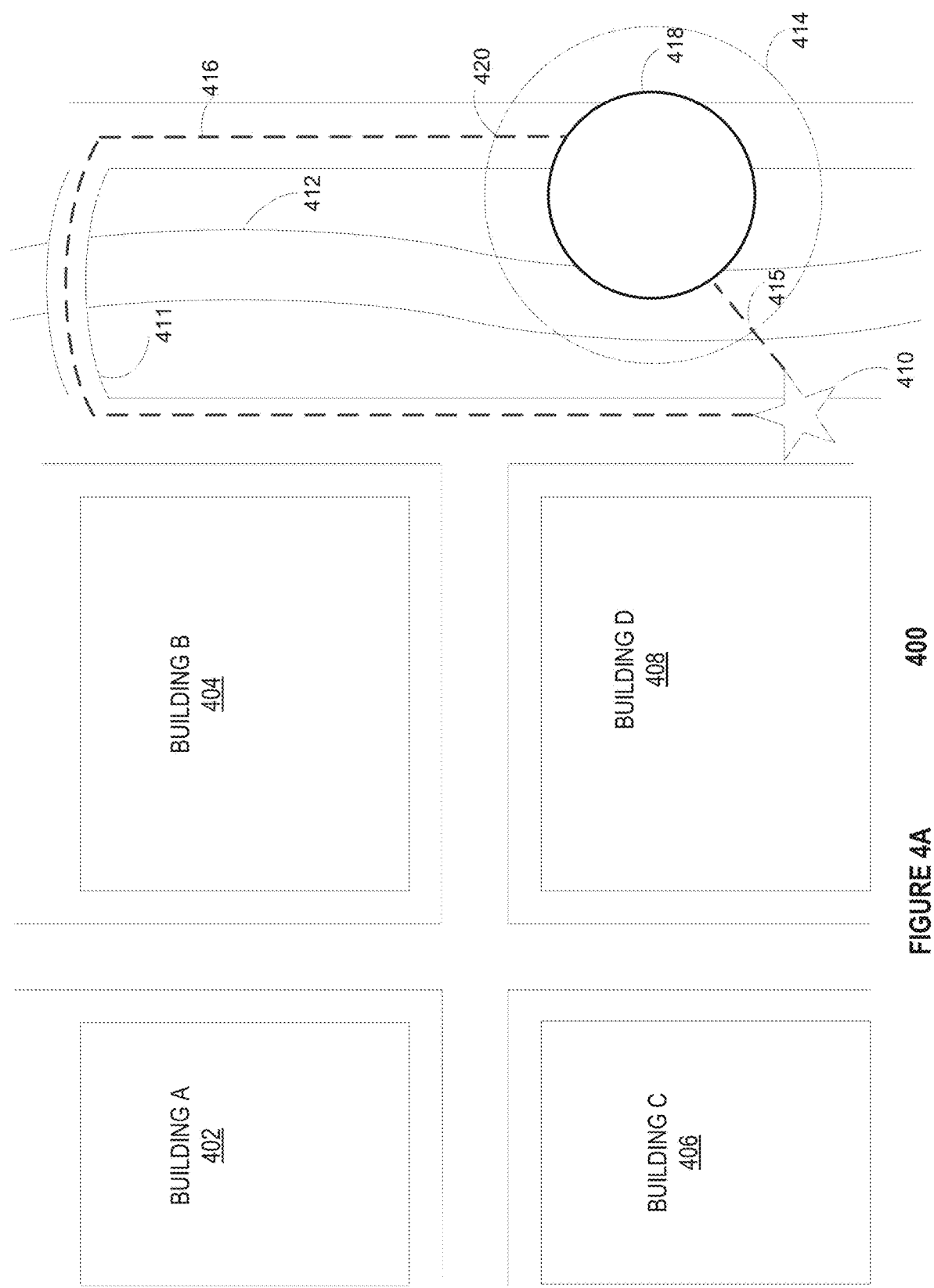
FIGS. 4A-4C depict an internal map of the server system for the purpose of calculating time to reach values for various geo-fences, in accordance with some example embodiments.

FIG. 4A depicts an internal map 400 of the server system (e.g., system 120 in FIG. 1) for the purpose of calculating time to reach values for various geo-fences, in accordance with some example embodiments. The time to reach module (e.g., module 124 in FIG. 1) first determines the location of the client system (e.g., system 102 in FIG. 1). In this case, the position 410 of the client system (e.g., system 102 in FIG. 1) is represented by the star. The area near the client system (e.g., system 102 in FIG. 1) location includes Building A 402, Building B 404, Building C 406, and Building D 408. In addition, the location includes a river 412 and a bridge 411 over the river.

The time to reach module 124 then selects one or more target geo-fences. In this case, the target geo-fence is 418. The time to reach module 124 module also calculates a notification area 414 around the boundaries of the target geo-fence 416. The notification area 414 is an area that surrounds a geo-fence and when the client system (e.g., system 102 in FIG. 1) crosses into the notification area, the client system (e.g., system 102 in FIG. 1) generates a notification for the user (e.g., notifying the user about a store or other location associated with the target geo-fence). In some example embodiments, the notification area is established at a certain distance from the target geo-fence (e.g., one mile away from the geo-fence boundary). In other embodiments, the notification area is based on a determined time to reach. Thus, the time to reach module 124 generates a notification whenever the client system (e.g., system 102 in FIG. 1) has a time to reach value for a respective geo-fence that is equal to or less than a predetermined time value. For example, the server system (e.g., system 120 in FIG. 1) determines that for a respective geo-fence a notification should be delivered when the client system (e.g., system 102 in FIG. 1) is within 45 seconds of reaching a boundary associated with the geo-fence. The time to reach module 124 then monitors the time to reach value for a particular geo-fence. When the time to reach value is 45 seconds or less, a notification is generated. In some example embodiments, a notification is only delivered once. In other embodiments, the time to reach module 124 generates more than one notification as the time to reach value approaches zero (e.g., the user gets closer to the respective geo-fence.).

In some example embodiments, the time to reach module 124 then generates a predicted travel path 416 from the current location associated with the client system (e.g., system 102 in FIG. 1). The time to reach module 124 generates the predicted travel path 416 based on a determined mode of travel and the possible paths for the determined mode of travel. For example, a user on a bike has different possible travel paths than a user riding a train. Thus, the predicted travel path can be longer than a straight line between the client system (e.g., system 102 in FIG. 1) and the respective geo-fence boundary (e.g., when a straight line path traverses an obstacle that the user cannot, in real life, traverse, such as a building or a mountain when travelling by car).

In the current example, the time to reach module 124 determines that the user is travelling via a car and thus cannot cross the river 412 without a bridge. Thus, the predicted path includes travelling north to the bridge 411, crossing the bridge 411, and returning south to an interaction point (420) with the boundary of the geo-fence 418. Thus, the predicted time to reach value is much longer that the time to reach value that would exist if a straight line path 415 were able to be followed.

Figure 4B:
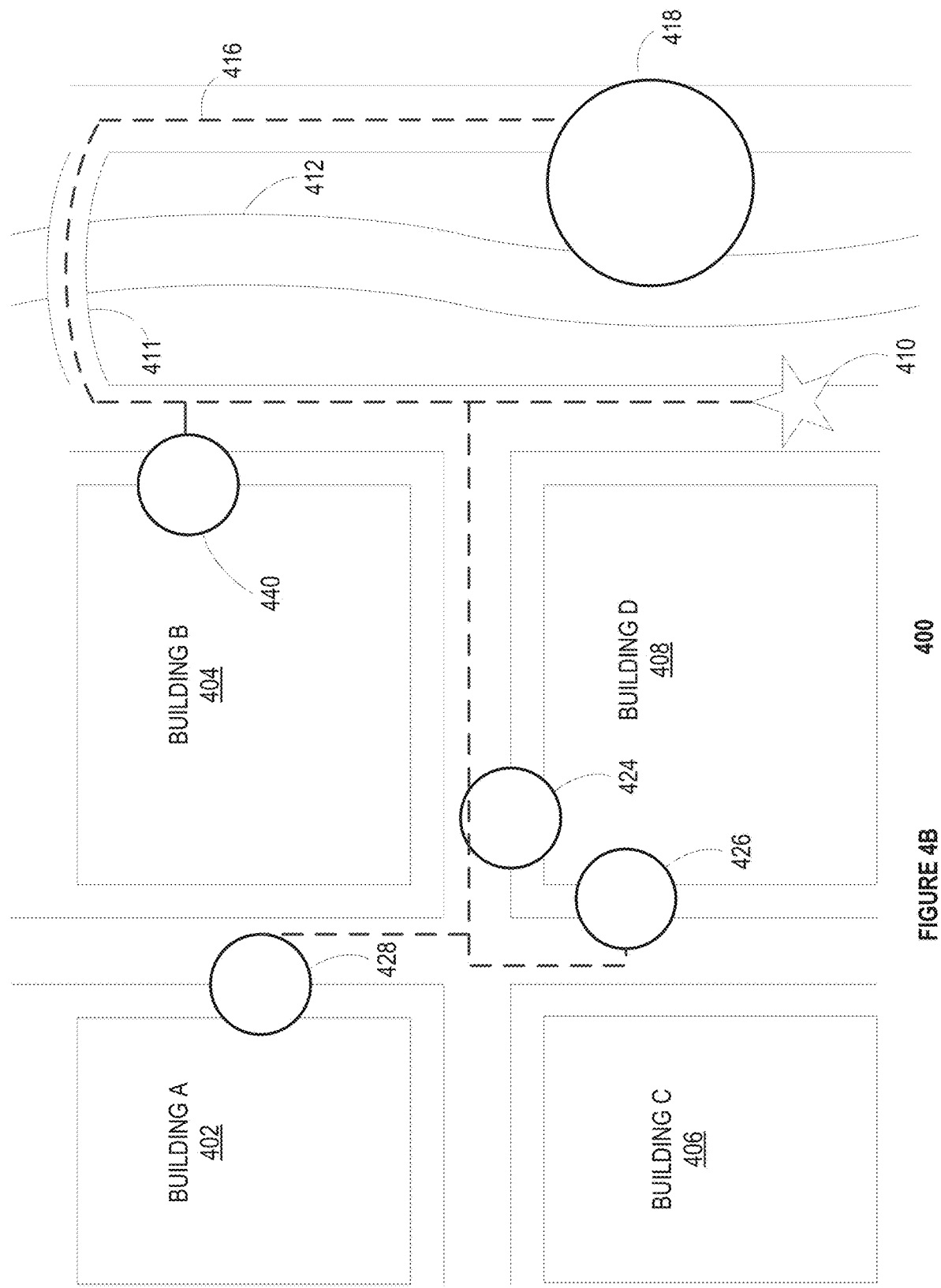

FIG. 4B depicts a block diagram of an internal map 400 of the server system (e.g., system 120 in FIG. 1) for the purpose of calculating time to reach values for various geo-fences, in accordance with some example embodiments. As in FIG. 4A, the time to reach module 124 first determines the location of a client system (e.g., system 102 in FIG. 1) and maps that location to an internal map 400 representation. Thus, the user position 410 (e.g., the position of the client system) is shown on a map with multiple buildings (402, 404, 406, and 408), a river 412, and a bridge 411.

The geo-fence data module 126 determines the mode of travel for the user position 410. In this case the geo-fence data module 126 determines that the user is travelling by car (based on the user's position and speed). The geo-fence data module 126 then selects a plurality of potential geo-fences (416, 418, 424, 426, 428, and 440) and predicts a travel path to at least some of them. The geo-fence data module 126 then calculates a time to reach for at least some geo-fences in the plurality of potential geo-fences. The predicted paths follow the rules for driving on roads (turn signals, driving in the correct lane) because the determined mode of travel is a car.

The geo-fence data module 126 then determines the specific number of geo-fences needed. This can be based on a number specifically requested by a user (e.g., the user requests the four closest geo-fences for steakhouses) or determined by the client system (e.g., system 102 in FIG. 1). For example, many smart phones have dedicated space for the data from ten geo-fences and no more.

Once the geo-fence data module 126 determines the specific number of geo-fences needed, it selects, from the plurality of potential geo-fences, a number of geo-fences having the smallest time to reach values. For example, if the geo-fence data module 126 determines that two geo-fences are needed, the geo-fence data module 126 selects the two geo-fences with the smallest time to reach values. In the example of FIG. 4B, geo-fence 418 would be the closest if a straight line measurement is used, but its predicted path is the longest, and as such, it is not selected by the geo-fence data module 126.

Instead, geo-fence 440 has the shortest time to reach value followed by geo-fence 424. These two geo-fences are selected and transmitted to the requesting client system (e.g., system 102 in FIG. 1).

Figure 4C:
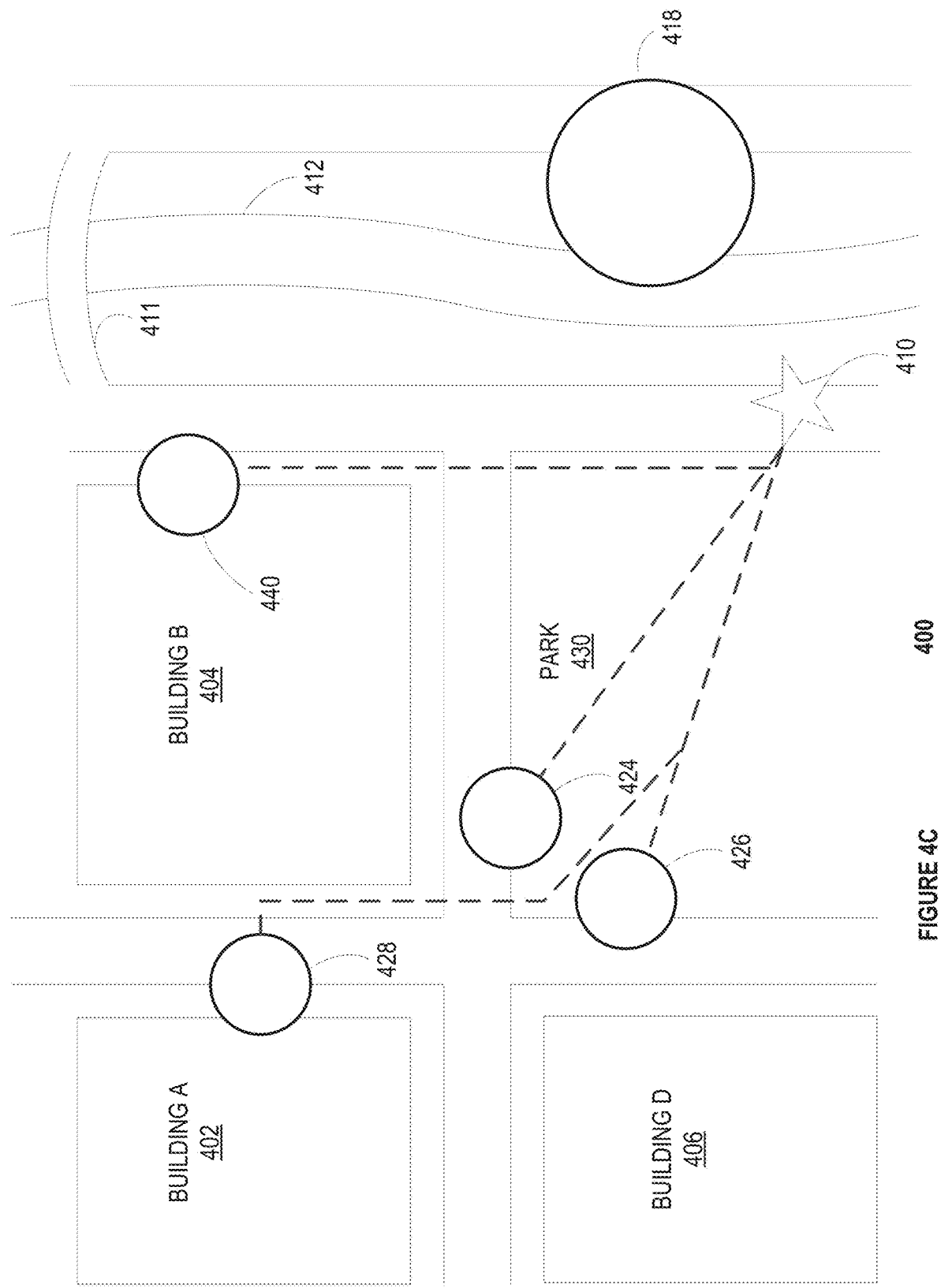

FIG. 4C depicts a block diagram of an internal map 400 of the server system (e.g., system 120 in FIG. 1) for the purpose of calculating time to reach values for various geo-fences, in accordance with some example embodiments. As in FIG. 4B, the time to reach module 124 first determines the location of a client system (e.g., system 102 in FIG. 1) and maps that location to an internal map 400 representation. Thus, the user position 410 (e.g., the position of the client system) is shown on a map with multiple buildings (402, 404, and 406), a park 430, a river 412, and a bridge 411.

The geo-fence data module 126 determines the mode of transport for the user position 410. In this case the geo-fence data module 126 determines that the user is travelling on foot (e.g., walking). The geo-fence data module 126 uses the time to reach module 124 to calculate predicted walking paths for each of the plurality of potential geo-fences. Because the user is walking, the time to reach module 124 can plot paths across a park. However, a pedestrian is unable to cross the bridge 411 (so the user will never reach geo-fence 418) and must use crosswalks and sidewalks to reach geo-fences 428 and 440 respectively.

As such, when the geo-fence data module 126 needs to select the two most important geo-fences, it selects geo-fence 424 and geo-fence 426 as having the lowest time to reach values.

Figure 5:
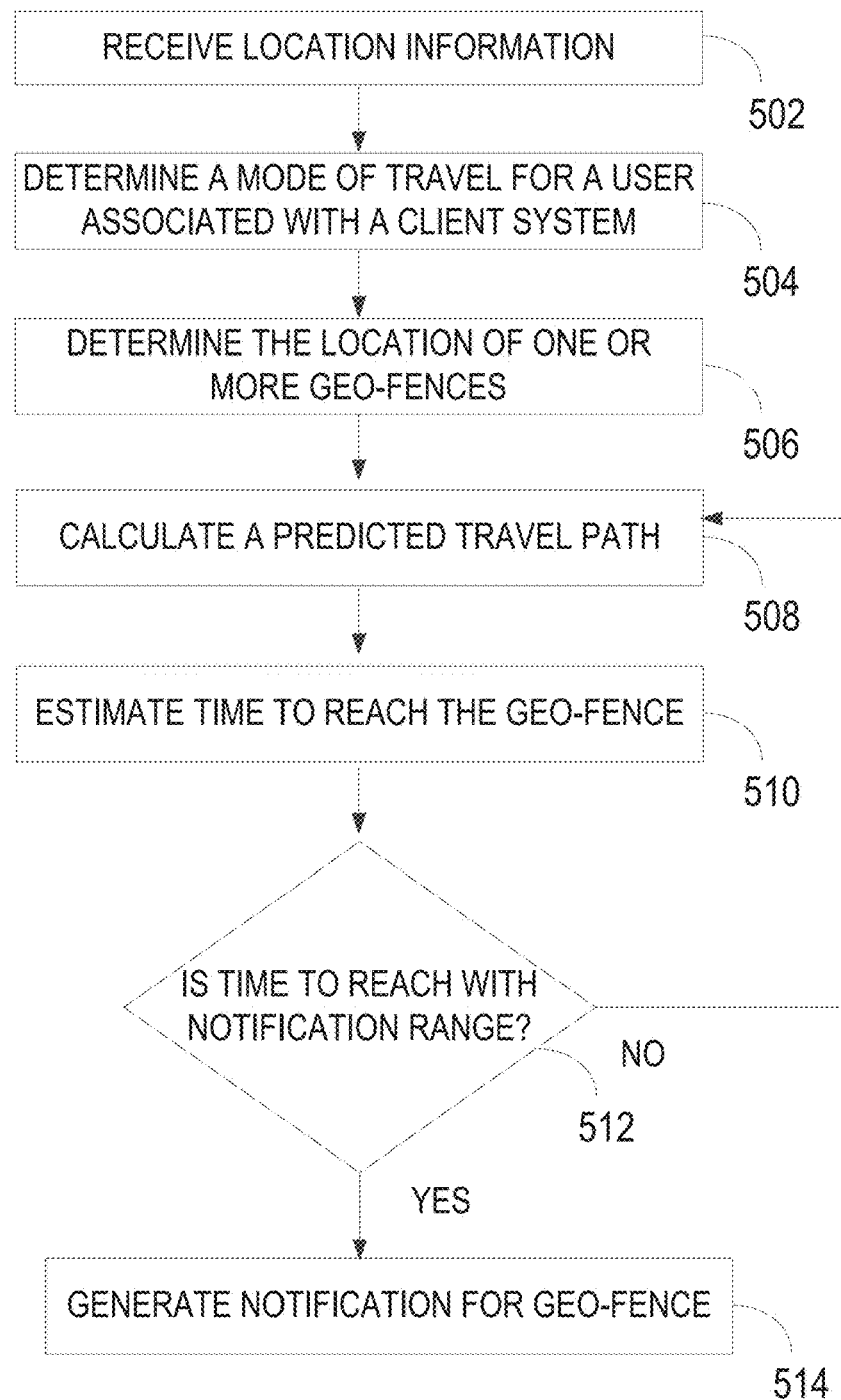
FIG. 5 is a flow diagram illustrating a process for enabling a smart watch system to dynamically add or remove link components, in accordance with some implementations.

FIG. 5 is a flow diagram illustrating a process for enabling a smart watch system to dynamically add or remove link components, in accordance with some implementations. Each of the operations shown in FIG. 5 corresponds, in some embodiments, to instructions stored in a computer memory or computer readable storage medium. In some implementations, the method described with reference to FIG. 5 is performed by a client system (e.g., system 102 in FIG. 1).

The method is performed at a client system (e.g., system 102 in FIG. 1) including one or more processors and memory storing one or more programs for execution by the one or more processors. The client system (e.g., system 102 in FIG. 1) receives (502) location information for a client system (e.g., system 102 in FIG. 1). For example, the location information is the up-to-date GPS location coordinates for the client system (e.g., system 102 in FIG. 1).

The client system (e.g., system 102 in FIG. 1) then determines (504) a mode of travel for the client system (e.g., system 102 in FIG. 1). In some example embodiments, this is determined by analyzing a series of location data for the client system (e.g., system 102 in FIG. 1) over a period of time. This allows the client system (e.g., system 102 in FIG. 1) to determine a speed of travel and the route of travel. Based on how fast the client system (e.g., system 102 in FIG. 1) is moving and the route that it takes, the client system (e.g., system 102 in FIG. 1) can determine the mode of travel. For example, if the client system (e.g., system 102 in FIG. 1) is moving at 60 miles per hour down a route following a heavily trafficked highway, the client system (e.g., system 102 in FIG. 1) determines that the user is travelling by car. Conversely, if the client system (e.g., system 102 in FIG. 1) determines that the user is travelling at 12 miles per hour along a common bicycle route, the client system (e.g., system 102 in FIG. 1) determines that the user is travelling by bicycle.

The client system (e.g., system 102 in FIG. 1) then determines (506) the location of one or more geo-fences. In some example embodiments, the one or more determined geo-fences are geo-fences that are the closest to the current location of the client system (e.g., system 102 in FIG. 1). In some example embodiments, a geo-fence has one or more boundaries and the location of the geo-fence relative to the client system (e.g., system 102 in FIG. 1) is the closest boundary (or point on the boundary) to the client system (e.g., system 102 in FIG. 1).

The client system (e.g., system 102 in FIG. 1) then calculates a predicted (508) travel path. A predicted travel path is the path that the client system (e.g., system 102 in FIG. 1) expects to travel to reach the geo-fence. Often, the predicted travel path is the shortest travel path available from the current location of the client system (e.g., system 102 in FIG. 1) and the nearest boundary of the geo-fence based on the travel mode of the client system (e.g., system 102 in FIG. 1). In some example embodiments, the client system (e.g., system 102 in FIG. 1) stores maps and a mapping algorithm for planning travel routes between two points.

The client system (e.g., system 102 in FIG. 1) then estimates (510) the time to reach the geo-fence (e.g., the nearest boundary of a geo-fence) based on the predicted travel route and the current mode of travel. For example, if the predicted travel path is two miles long and the client system (e.g., system 102 in FIG. 1) has determined that the user is travelling by foot at a rate of about three miles per hour, the client system (e.g., system 102 in FIG. 1) will estimate a time to reach value of 40 minutes. The client system (e.g., system 102 in FIG. 1) may also determine whether there are any stop lights (or other temporary obstacles) on the predicted travel path and add an estimated waiting time to the time to reach value. Thus, if there are three lights with cross-walks on the path, the client system (e.g., system 102 in FIG. 1) will estimate an average wait time of about 30 seconds and add 1 minute and 30 seconds onto the time to reach value.

The client system (e.g., system 102 in FIG. 1) then determines (512) whether the current time to reach value is within notification range. In other words, the client system (e.g., system 102 in FIG. 1) determines whether the current time to reach value is equal to or less than a specific amount time. In some example embodiments, the amount of time is predetermined. For example, the client system (e.g., system 102 in FIG. 1) uses 60 seconds as its notification range value and any time to reach values equal to or less than 60 seconds are determined to be within the notification range. In other embodiments, the specific time is based on the specific geo-fence (e.g., the person or organization that the geo-fence is associated with may give a specific value.). In other embodiments, the notification range value is determined based on the speed of travel and the type of geo-fence.

In accordance with a determination that the time to reach value is not within the notification range, the client system (e.g., system 102 in FIG. 1) then begins a new cycle with a new predicted route (508). This is especially important if the user has not followed the originally predicted route. In some example embodiments, calculating a new predicted travel path also includes updating the location information for the client system (e.g., system 102 in FIG. 1).

In accordance with a determination that the time to reach value is within the notification range, the client system (e.g., system 102 in FIG. 1) generates (514) a notification. In some example embodiments, the notification is presented to the user through the client system (e.g., system 102 in FIG. 1) by visual (e.g., a display), audio (e.g., a tone through a speaker), tactile (a vibrating phone), or other means available to the client system (e.g., system 102 in FIG. 1). In some example embodiments, the client system (e.g., system 102 in FIG. 1) also transmits a notification to a server system (e.g., system 120 in FIG. 1) associated with the client system (e.g., system 102 in FIG. 1).

FIG. 6 is a flow diagram illustrating a process for enabling a smart watch system to dynamically add or remove link components, in accordance with some implementations. Each of the operations shown in FIG. 6 corresponds, in some embodiments, to instructions stored in a computer memory or computer readable storage medium. In some implementations, the method described with reference to FIG. 6 is performed by a server system (e.g., system 120 in FIG. 1).

The method is performed at a server system (e.g., system 120 in FIG. 1) including one or more processors and memory storing one or more programs for execution by the one or more processors. The server system (e.g., system 120 in FIG. 1) receives (602) location information for a client system (e.g., system 102 in FIG. 1). For example, the location information is the up-to-date GPS location coordinates for the client system (e.g., system 102 in FIG. 1).

The server system (e.g., system 120 in FIG. 1) then determines (604) a mode of travel for the client system (e.g., system 102 in FIG. 1). In some example embodiments, this is determined by analyzing a series of location data updates from the client system (e.g., system 102 in FIG. 1) over a period of time. This allows the server system (e.g., system 120 in FIG. 1) to determine a speed of travel and the route of travel for the client system (e.g., system 102 in FIG. 1). Based on how fast the client system (e.g., system 102 in FIG. 1) is moving and the route that the client system (e.g., system 102 in FIG. 1) takes, the server system (e.g., system 120 in FIG. 1) determines the mode of travel. For example, if the server system (e.g., system 120 in FIG. 1) determines that the client system (e.g., system 102 in FIG. 1) is travelling at 75 miles per hour, the server system (e.g., system 120 in FIG. 1) would likely determine the client system (e.g., system 102 in FIG. 1) is travelling by car.

The server system (e.g., system 120 in FIG. 1) identifies (606) a plurality of geo-fences. The plurality of geo-fences is identified based on their proximity to the location of the client system (e.g., system 102 in FIG. 1). In some example embodiments, the plurality of identified geo-fences are geo-fences that are the closest to the current location of the client system (e.g., system 102 in FIG. 1). In some example embodiments, a geo-fence has one or more boundaries and the location of the geo-fence relative to the client system (e.g., system 102 in FIG. 1) is the closest boundary (or point on the boundary) to the client system (e.g., system 102 in FIG. 1).

The server system (e.g., system 120 in FIG. 1) then calculates a predicted (608) travel path for each geo-fence in the plurality of identified geo-fences from the location associated with the client system (e.g., system 102 in FIG. 1). A predicted travel path is the path that the server system (e.g., system 120 in FIG. 1) expects the client system (e.g., system 102 in FIG. 1) to travel to reach the geo-fence (e.g., the nearest boundary of the geo-fence).

The server system (e.g., system 120 in FIG. 1) then estimates (610) the time to reach each geo-fence (e.g., the nearest boundary of a geo-fence) in the plurality of geo-fences based on the predicted travel route and the current mode of travel. Thus the server system (e.g., system 120 in FIG. 1) calculates a time to reach value for each geo-fence in the plurality of geo-fences.

The server system (e.g., system 120 in FIG. 1) then ranks (612) each geo-fence in the plurality of geo-fences based on their associated time to reach value. For example, the plurality of geo-fences are put into a list with the geo-fences with the smallest time to reach values listed first and the geo-fences with greater time to reach values listed later.

The server system (e.g., system 120 in FIG. 1) selects (614) a number of geo-fences in the plurality of geo-fences based on the rankings. In some example embodiments, the number selected is based on the number of geo-fences that the client system (e.g., system 102 in FIG. 1) is able to simultaneously store. For example, some smartphones have enough space to store the data for ten geo-fences at a time. In this case, the server system (e.g., system 120 in FIG. 1) selects the ten geo-fences with the lowest time to reach values.

The server system (e.g., system 120 in FIG. 1) then transmits (616) the selected geo-fences to the client system (e.g., system 102 in FIG. 1). The client system (e.g., system 102 in FIG. 1) can then monitor its own movement and determine when one of the boundaries for one of the geo-fences has been crossed.

Figure 7A:
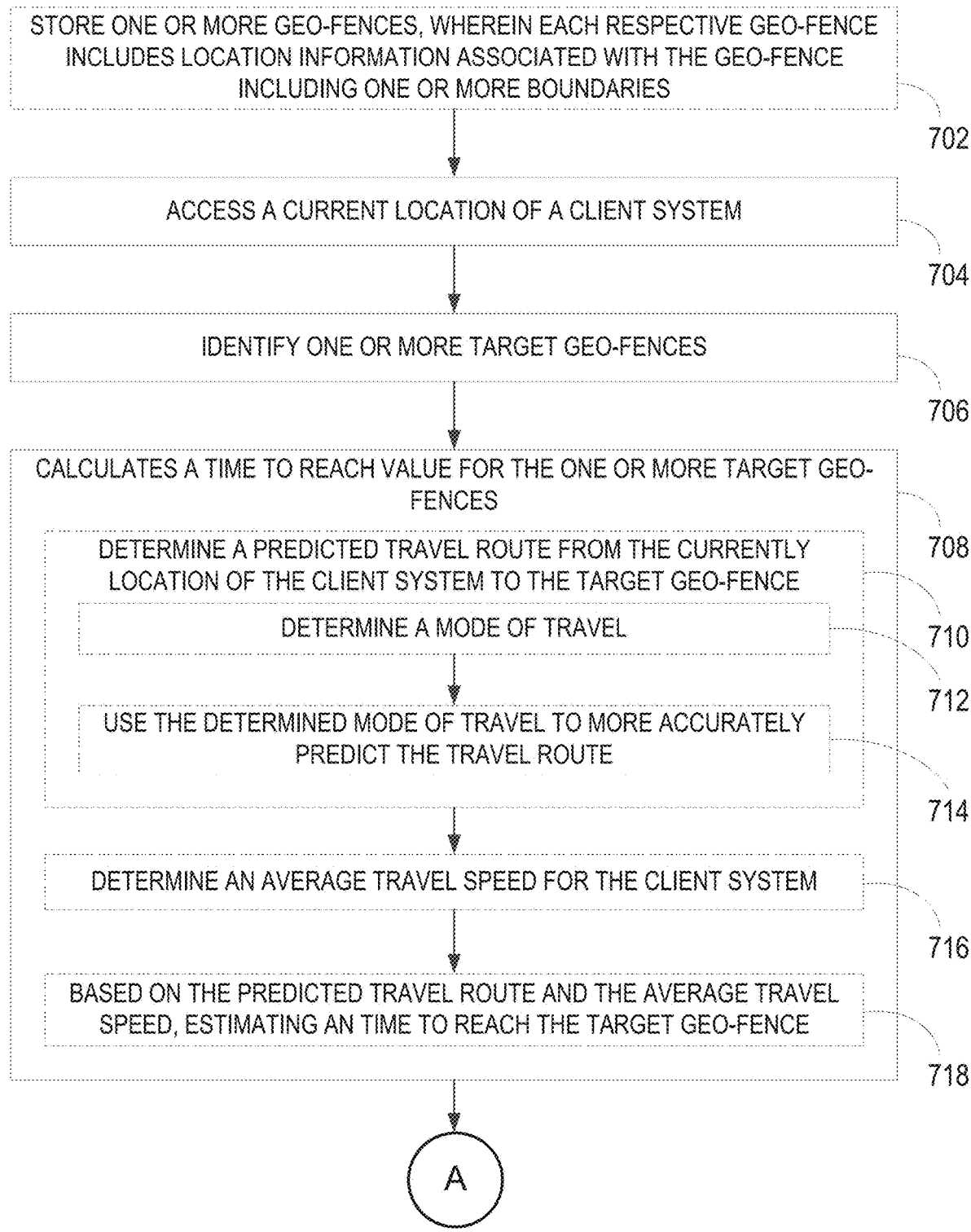
FIG. 7A is a flow diagram illustrating a method for using time to reach values to schedule notifications for geo-fences, in accordance with some implementations.

FIG. 7A is a flow diagram illustrating a method for using time to reach values to schedule notifications for geo-fences, in accordance with some implementations. Each of the operations shown in FIG. 7A may correspond to instructions stored in a computer memory or computer readable storage medium. Optional operations are indicated by dashed lines (e.g., boxes with dashed-line borders). In some implementations, the method described in FIG. 7A is performed by the client system (e.g., system 102 in FIG. 1). However, the method described can also be performed by any other suitable configuration of electronic hardware.

In some implementations, the method is performed at a client system (e.g., system 102 in FIG. 1) including one or more processors and memory storing one or more programs for execution by the one or more processors.

In some example embodiments, the client system (e.g., system 102 in FIG. 1) stores (702) one or more geo-fences, wherein each respective geo-fence includes location information associated with the geo-fence including one or more boundaries. For example, each geo-fence includes a single point and a radius. The boundary for the geo-fence is a circle around that point with the radius. In other examples, each geo-fence has four or more points that define the corners and boundaries of the geo-fence.

The client system (e.g., system 102 in FIG. 1) accesses (704) a current location of a client system. For example, the client system (e.g., system 102 in FIG. 1) uses a GPS module within the client system (e.g., system 102 in FIG. 1) to determine the client system's (e.g., system 102 in FIG. 1) precise location.

The client system (e.g., system 102 in FIG. 1) then identifies (706) one or more target geo-fences. In some example embodiments, the client system (e.g., system 102 in FIG. 1) selects the closest current geo-fence for which it has data. In other embodiments, the client system (e.g., system 102 in FIG. 1) requests geo-fence data from a server system (e.g., system 120 in FIG. 1) based on its current location. In some example embodiments, the client system (e.g., system 102 in FIG. 1) stores data for ten distinct geo-fences at a given time.

The client system (e.g., system 102 in FIG. 1) then calculates (708) a time to reach value for the one or more target geo-fences. A time to reach value represents the estimated amount of time between the client system's (e.g., system 102 in FIG. 1) current position and at least one boundary of the target geo-fence. For example, the time to reach value between Point A and Point B is based off the distance between the two and the travel speed.

In some example embodiments, the client system (e.g., system 102 in FIG. 1) calculates the time to reach value for a particular geo-fence by determining (710) a predicted travel route from the current location of the client system to the target geo-fence. To accomplish this, the client system (e.g., system 102 in FIG. 1) has map data stored and a path generation algorithm and uses them to find routes between points. In some example embodiments, the client system (e.g., system 102 in FIG. 1) determines a travel path to the nearest boundary or point on the boundary of the geo fence (e.g., the shortest distance to be inside the geo fence.)

In some example embodiments determining a predicted travel route further includes determining (712) a mode of travel. This determining is based on one or more factors including, but not limited to, the position of the client system (e.g., system 102 in FIG. 1) (e.g., a user located on a highway is likely in a car and a user located in a park is likely on foot), the speed of travel (e.g., certain speeds are associated with certain modes of travel), stored user preferences, and past user modes of travel.

The client system (e.g., system 102 in FIG. 1) then uses (714) the determined mode of travel to more accurately predict the travel route. For example, if the determined mode of travel is walking, the client system (e.g., system 102 in FIG. 1) determines a travel route that can be traversed by walking. Thus if the only way to cross a river is a train bridge, the client system (e.g., system 102 in FIG. 1) either finds a longer route or lists the geo-fence as effectively unreachable. In some example embodiments, the client system (e.g., system 102 in FIG. 1) can take public transportation routes into account when plotting the travel route of a user. This is especially true if the user profile indicates a history of using public transport. Conversely, if the user is determined to be on a train, the client system (e.g., system 102 in FIG. 1) only considers geo-fences that are near the train tracks.

In some example embodiments, the client system (e.g., system 102 in FIG. 1) then determines (716) an average travel speed for the client system (e.g., system 102 in FIG. 1). For example, over a given time, the client system (e.g., system 102 in FIG. 1) determines that the client system (e.g., system 102 in FIG. 1) has traveled a certain distance (based on periodic location updates). The client system (e.g., system 102 in FIG. 1) then calculates average speed based on the ratio of distance traveled to time elapsed. The average speed will typically be more accurate when more time has elapsed.

In some example embodiments, the client system (e.g., system 102 in FIG. 1) estimates (718) a time to reach the target geo-fence based on the total distance for the predicted travel route and the average travel speed.

Figure 7B:
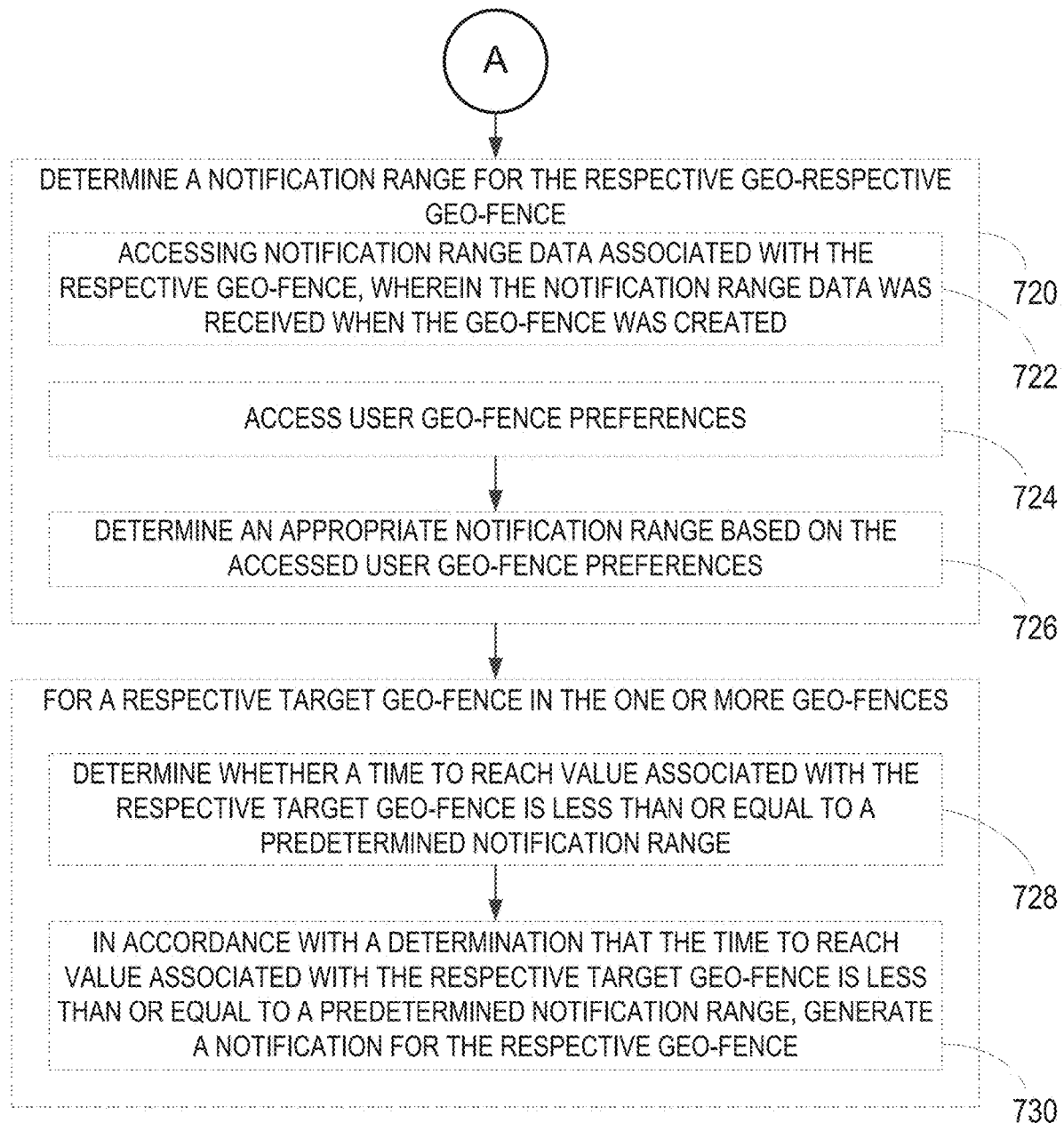
FIG. 7B is a flow diagram illustrating a method for using time to reach values to schedule notifications for geo-fences, in accordance with some implementations.

FIG. 7B is a flow diagram illustrating a method for using time to reach values to schedule notifications for geo-fences, in accordance with some implementations. Each of the operations shown in FIG. 7B may correspond to instructions stored in a computer memory or computer readable storage medium. Optional operations are indicated by dashed lines (e.g., boxes with dashed-line borders). In some implementations, the method described in FIG. 7B is performed by the client system (e.g., system 102 in FIG. 1). However, the method described can also be performed by any other suitable configuration of electronic hardware.

In some implementations, the method is performed at a client system (e.g., system 102 in FIG. 1) including one or more processors and memory storing one or more programs for execution by the one or more processors.

The server system (e.g., system 120 in FIG. 1) determines (720) a notification range for the respective geo-respective geo-fence. In some example embodiments, a notification range is an amount of time at which a notification should be given to a user. For example, if the notification range is 60 seconds, the notification should be generated when the time to reach value is less than 60 seconds. In other embodiments, a notification range is a time period within which a notification should be given to a user. Thus, the time period includes an earliest notification value and a latest notification value, such that no notification should be generated before the earliest notification value and no notification should be generated after the latest notification value. For example, the notification range is from 120 seconds to 30 seconds. Based on this, the client system (e.g., system 102 in FIG. 1) can send the notification no earlier than 120 seconds and no later than 30 seconds.

In some example embodiments, the client system (e.g., system 102 in FIG. 1) accesses (722) notification range data associated with the respective geo-fence to determine the notification range, wherein the notification range data was received when the geo-fence was created. For example, if the geo-fence was established by a corporation (e.g., a geo-fence around each of its stores), the corporation would also specify a notification range (how close the user had to be before getting a notification.) In another example, a user can set or request their own geo-fences and notification ranges. The user can request that they get a notification when they come within 60 seconds of a flower shop so they can purchase flowers that day.

In some example embodiments, the client system (e.g., system 102 in FIG. 1) accesses (724) user geo-fence preferences. In some example embodiments, user geo-fence preferences are stored in a user profile. In some example embodiments, the user preferences are explicitly set by the user (e.g., the user indicates that all notifications should be given with at least 120 seconds left to reach the geo-fence). In other embodiments, the user preferences are implicitly determined based on past user behavior (e.g., the user never responds to notifications delivered with more than 180 seconds left to reach.) In some example embodiments, the user preferences differ based on the mode of travel. For example, the user may prefer extremely early notifications when travelling by car on a highway (e.g., so they can take the appropriate exit) and prefer later notifications when on foot.

The client system (e.g., system 102 in FIG. 1) then determines (726) an appropriate notification range based on the accessed user geo-fence preferences. For example, if the user has consistently responded to notifications that arrive 75 seconds away from the geo-fence, the client system (e.g., system 102 in FIG. 1) uses 75 seconds as the notification range for any geo-fence that does not already have a predetermined notification range.

In some example embodiments, for a respective target geo-fence in the one or more geo-fences, the server system (e.g., system 120 in FIG. 1) determines (728) whether a time to reach value associated with the respective target geo-fence is less than or equal to a predetermined notification range. For example, if the notification range is 75 seconds and the current time to reach value is 69 seconds, the client system (e.g., system 102 in FIG. 1) determines that the time to reach is less than the notification range.

In accordance with a determination that the time to reach value associated with the respective target geo-fence is less than or equal to a predetermined notification range, the client system (e.g., system 102 in FIG. 1) generates (730) a notification for the respective geo-fence. For example, the client system (e.g., system 102 in FIG. 1) can present an audio or visual notification at the client system (e.g., system 102 in FIG. 1).

Figure 8A:
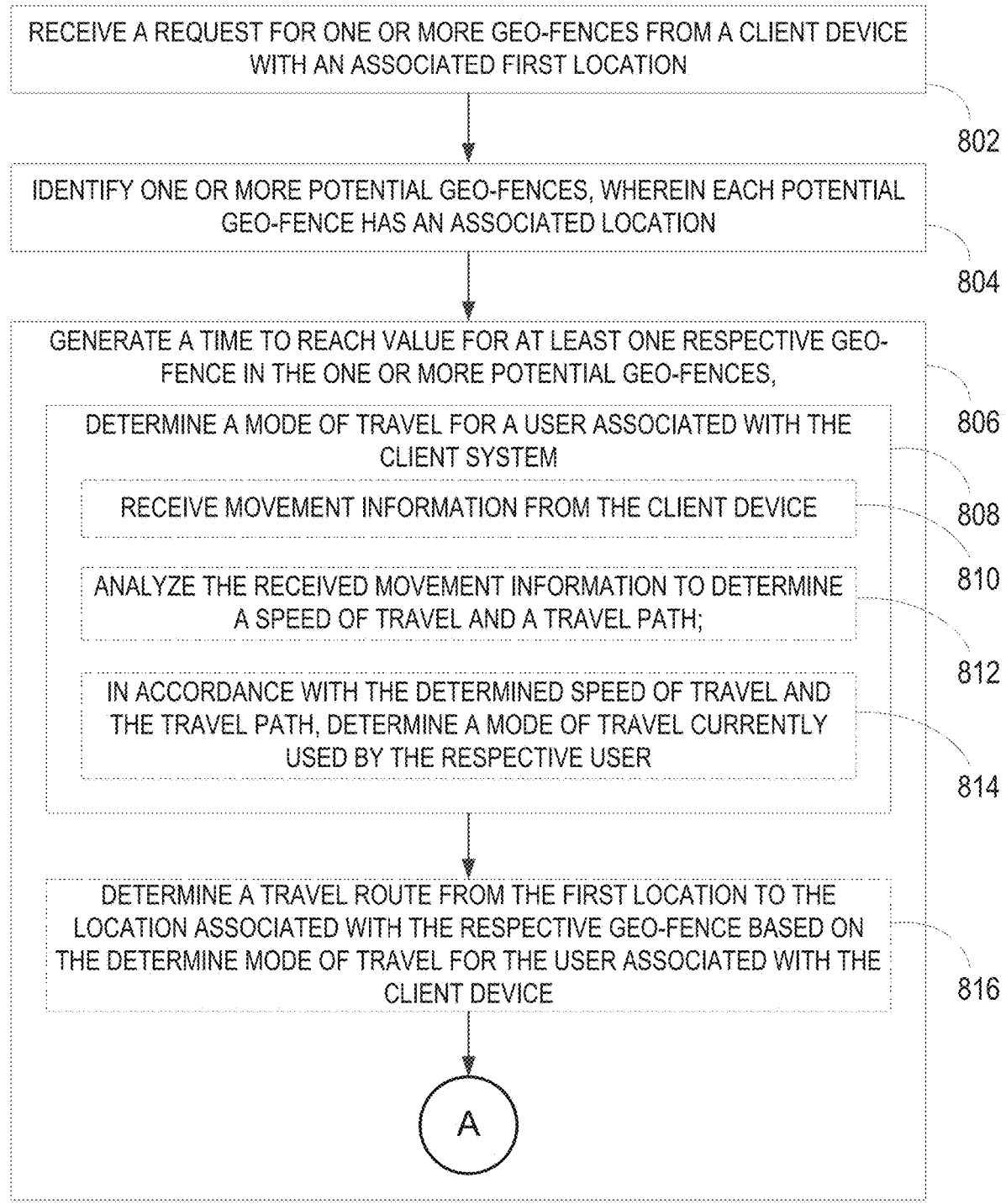
FIG. 8A is a flow diagram illustrating a method for selecting the most relevant geo-fences for a client system, in accordance with some implementations.

FIG. 8A is a flow diagram illustrating a method for selecting the most relevant geo-fences for a client system, in accordance with some implementations. Each of the operations shown in FIG. 8A may correspond to instructions stored in a computer memory or computer readable storage medium. Optional operations are indicated by dashed lines (e.g., boxes with dashed-line borders). In some implementations, the method described in FIG. 8A is performed by the server system (e.g., system 120 in FIG. 1). However, the method described can also be performed by any other suitable configuration of electronic hardware.

In some implementations, the method is performed at a server system (e.g., system 120 in FIG. 1) including one or more processors and memory storing one or more programs for execution by the one or more processors.

In some example embodiments, the server system (e.g., system 120 in FIG. 1) receives (802) a request for one or more geo-fences from a client device with an associated first location. In some example embodiments, the request is generated by the user of the client system (e.g., system 102 in FIG. 1). In other embodiments, the client system (e.g., system 102 in FIG. 1) automatically requests an additional geo-fence in response to the client system (e.g., system 102 in FIG. 1) crossing a geo-fence boundary (e.g., when it leaves the area represented by the currently stored geo-fence).

The server system (e.g., system 120 in FIG. 1) then identifies (804) one or more potential geo-fences, wherein each potential geo-fence has an associated location. The potential geo-fences are determined based on their proximity to the current position of the client system (e.g., system 102 in FIG. 1).

For at least one respective geo-fence in the one or more potential geo-fences, the server system (e.g., system 120 in FIG. 1) generates (806) a time to reach value. A time to reach value for a particular potential geo-fence is based on the distance needed to travel from the first location associated with the client device to the location associated with the respective geo-fence.

In some example embodiments, generating a travel distance for a respective geo-fence in the one or more geo-fences includes the server system (e.g., system 120 in FIG. 1) determining (808) a mode of travel for a user associated with the client device. To determine a mode of travel, the server system (e.g., system 120 in FIG. 1) receives (810) movement information from the client device. For example, the server system (e.g., system 120 in FIG. 1) receives periodic updates of the client system's (e.g., system 102 in FIG. 1) current location and can determine movement and speed based on the changes in location.

In some example embodiments the server system (e.g., system 120 in FIG. 1) stores a plurality of user profiles for a plurality of users. The server system (e.g., system 120 in FIG. 1) then analyzes information stored in the user profile of a respective user. For example, the user profile information may include car ownership status, public transportation ticket purchases (e.g., tickets purchased that day or a monthly/weekly ticket), bike ownership, historical travel routes and modes of travel (e.g., data stored on what the user has done in the past), and any other relevant information.

In accordance with an analysis of the user profile of the respective user, the server system (e.g., system 120 in FIG. 1) determines a mode of travel currently used by the respective user. For example, if historical information notes that the user frequently takes a specific route to work, the server system (e.g., system 120 in FIG. 1) can base the predicted travel route on that information.

In some example embodiments, the server system (e.g., system 120 in FIG. 1) analyzes (812) the received movement information to determine a speed of travel and a travel path. In accordance with the determined speed of travel and the travel path, the server system (e.g., system 120 in FIG. 1) determines (814) a mode of travel currently used by the respective user.

The server system (e.g., system 120 in FIG. 1) then determines (816) a travel route from the first location to the location associated with the respective geo-fence based on the determined mode of travel for the user associated with the client system (e.g., system 102 in FIG. 1).

Figure 8B:
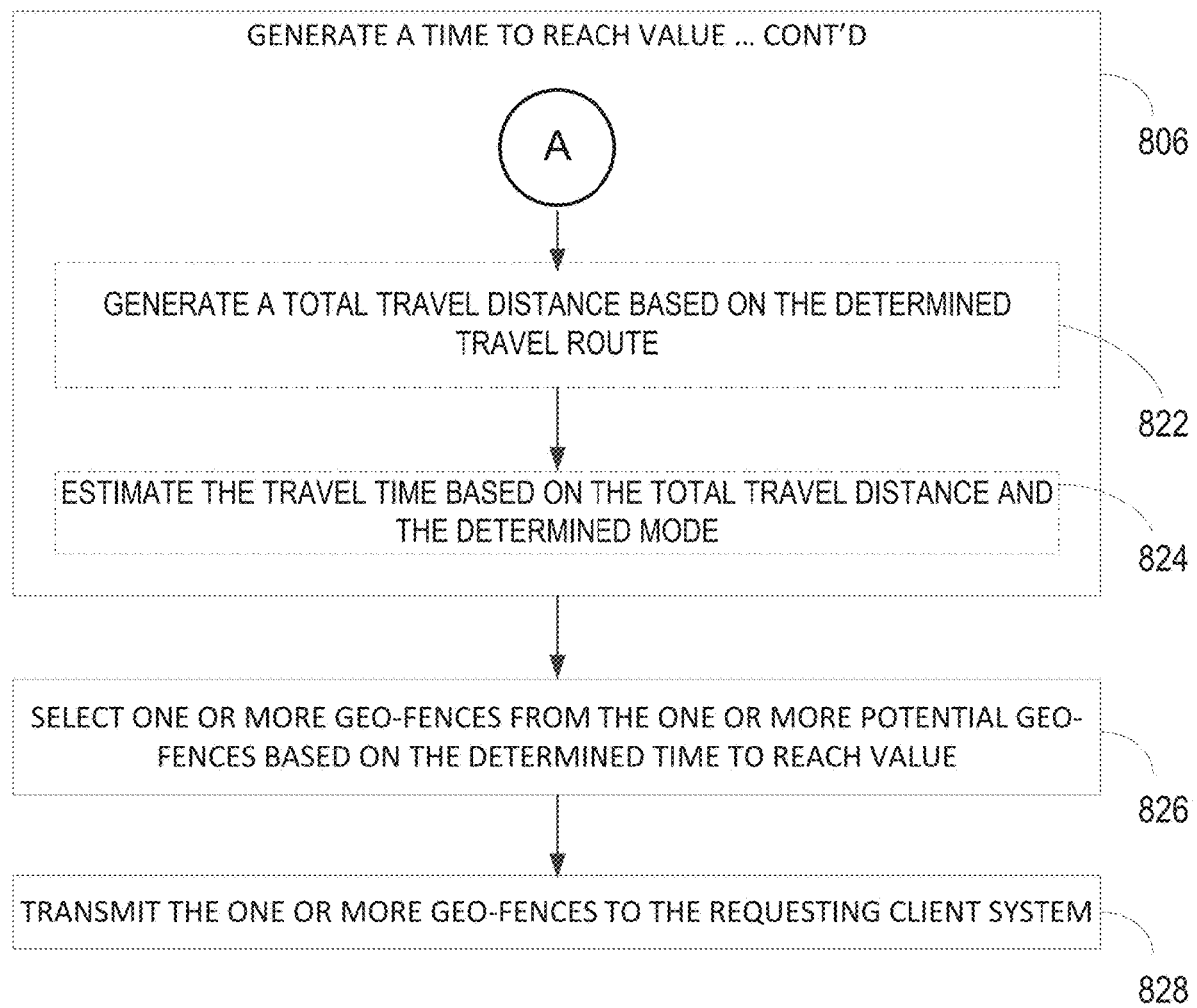
FIG. 8B is a flow diagram illustrating a method for selecting the most relevant geo-fences for a client system, in accordance with some implementations.

FIG. 8B is a flow diagram illustrating a method for selecting the most relevant geo-fences for a client system, in accordance with some implementations. Each of the operations shown in FIG. 8B may correspond to instructions stored in a computer memory or computer readable storage medium. Optional operations are indicated by dashed lines (e.g., boxes with dashed-line borders). In some implementations, the method described in FIG. 8B is performed by the server system (e.g., system 120 in FIG. 1). However, the method described can also be performed by any other suitable configuration of electronic hardware.

In some implementations the method is performed at a server system (e.g., system 120 in FIG. 1) including one or more processors and memory storing one or more programs for execution by the one or more processors.

The server system (e.g., system 120 in FIG. 1) generates (822) a total travel distance based on the determined travel route. For example, the server system (e.g., system 120 in FIG. 1) determines a route with 15 legs or stages and then determines a total distance travelled by adding all the distances for each leg or stage in the predicted travel route.

The server system (e.g., system 120 in FIG. 1) estimates (824) the travel time based on the total travel distance and the determined mode of travel. For example, the server system (e.g., system 120 in FIG. 1) users the determined mode of travel to estimate a travel speed and then divides the total travel distance by the estimated travel speed to arrive at a travel time (e.g., a time to reach).

The server system (e.g., system 120 in FIG. 1) then selects (826) one or more geo-fences from the one or more potential geo-fences based on the determined time to reach value. In some example embodiments, the server system (e.g., system 120 in FIG. 1) selects a predetermined number of geo-fences to transmit to the client device. In some example embodiments, the predetermined number of geo-fences is 10. In some example embodiments, the geo-fences selected are the ten fences with the lowest time to reach values.

The server system (e.g., system 120 in FIG. 1) then transmits (828) the one or more geo-fences to the requesting client system (e.g., system 102 in FIG. 1). In some example embodiments, the one or more selected geo-fences are combined into a single super geo-fence prior to transmitting.

Software Architecture

Figure 9:
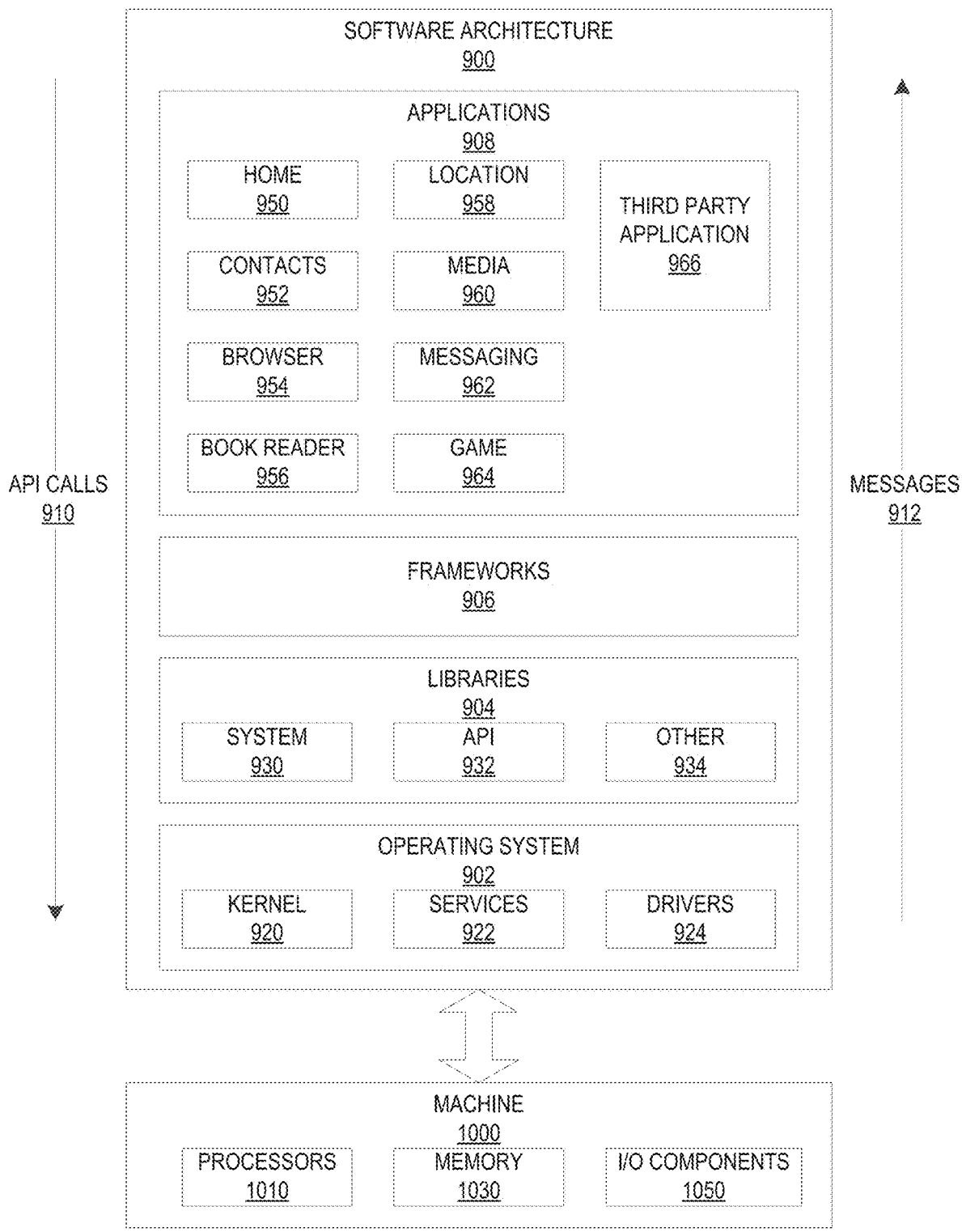
FIG. 9 is a block diagram illustrating an architecture of software, which may be installed on any one or more of devices of a computer system.

FIG. 9 is a block diagram illustrating an architecture of software 900, which may be installed on any one or more of devices of FIG. 1 (e.g., client device(s) 102). FIG. 9 is merely a non-limiting example of a software architecture and it will be appreciated that many other architectures may be implemented to facilitate the functionality described herein. The software 900 may be executing on hardware such as machine 1000 of FIG. 10 that includes processors 1010, memory 1030, and I/O components 1050. In the example architecture of FIG. 9, the software 900 may be conceptualized as a stack of layers where each layer may provide particular functionality. For example, the software 900 may include layers such as an operating system 902, libraries 904, frameworks 906, and applications 908. Operationally, the applications 908 may invoke application programming interface (API) calls 910 through the software stack and receive messages 912 in response to the API calls 910.

The operating system 902 may manage hardware resources and provide common services. The operating system 902 may include, for example, a kernel 920, services 922, and drivers 924. The kernel 920 may act as an abstraction layer between the hardware and the other software layers. For example, the kernel 920 may be responsible for memory management, processor management (e.g., scheduling), component management, networking, security settings, and so on. The services 922 may provide other common services for the other software layers. The drivers 924 may be responsible for controlling and/or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 904 may provide a low-level common infrastructure that may be utilized by the applications 908. The libraries 904 may include system libraries 930 (e.g., C standard library) that may provide functions such as memory allocation functions, string manipulation functions, mathematic functions, and the like. In addition, the libraries 904 may include API libraries 932 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 904 may also include a wide variety of other libraries 934 to provide many other APIs to the applications 908.

The frameworks 906 may provide a high-level common infrastructure that may be utilized by the applications 908. For example, the frameworks 906 may provide various graphic user interface (GUI) functions, high-level resource management, high-level location services, and so forth. The frameworks 906 may provide a broad spectrum of other APIs that may be utilized by the applications 908, some of which may be specific to a particular operating system or platform.

The applications 908 include a home application 950, a contacts application 952, a browser application 954, a book reader application 956, a location application 958, a media application 960, a messaging application 962, a game application 964, and a broad assortment of other applications such as third party application 966. In a specific example, the third party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 966 may invoke the API calls 910 provided by the mobile operating system 902 to facilitate functionality described herein.

Example Machine Architecture and Machine-Readable Medium

Figure 10:
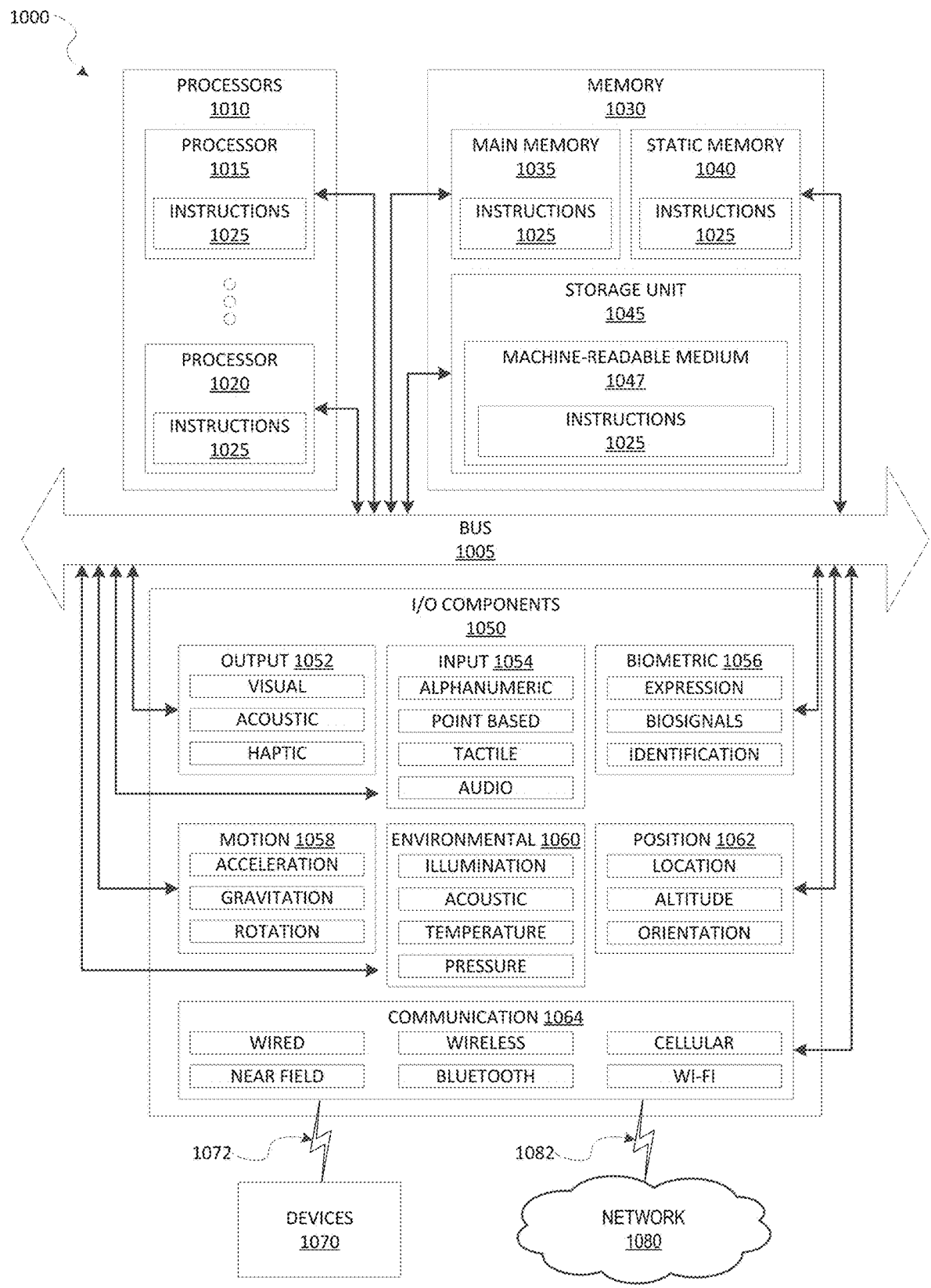
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1025 (e.g., software, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1025, sequentially or otherwise, that specify actions to be taken by machine 1000. Further, while only a single machine 1000 is illustrated, the term "machine" shall also be taken to include a collection of machines 1000 that individually or jointly execute the instructions 1025 to perform any one or more of the methodologies discussed herein.

The machine 1000 may include processors 1010, memory 1030, and I/O components 1050, which may be configured to communicate with each other via a bus 1005. In an example embodiment, the processors 1010 (e.g., a CPU, a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1015 and processor 1020 that may execute instructions 1025. The term "processor" is intended to include a multi-core processor that may comprise two or more independent processors (also referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory 1030 may include a main memory 1035, a static memory 1040, and a storage unit 1045 accessible to the processors 1010 via the bus 1005. The storage unit 1045 may include a machine-readable medium 1047 on which are stored the instructions 1025 embodying any one or more of the methodologies or functions described herein. The instructions 1025 may also reside, completely or at least partially, within the main memory 1035, within the static memory 1040, within at least one of the processors 1010 (e.g., within the processor's cache memory), or any suitable combination thereof, during execution thereof by the machine 1000. Accordingly, the main memory 1035, static memory 1040, and the processors 1010 may be considered as machine-readable media 1047.

As used herein, the term "memory" refers to a machine-readable medium 1047 able to store data temporarily or permanently and may be taken to include, but not be limited to, random-access memory (RAM), read-only memory (ROM), buffer memory, flash memory, and cache memory. While the machine-readable medium 1047 is shown in an example embodiment to be a single medium, the term "machine-readable medium" should be taken to include a single medium or multiple media (e.g., a centralized or distributed database, or associated caches and servers) able to store instructions 1025. The term "machine-readable medium" shall also be taken to include any medium, or combination of multiple media, that is capable of storing instructions (e.g., instructions 1025) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 may include a wide variety of components to receive input, provide and/or produce output, transmit information, exchange information, capture measurements, and so on. It will be appreciated that the I/O components 1050 may include many other components that are not shown in FIG. 10. In various example embodiments, the I/O components 1050 may include output components 1052 and/or input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 1050 may include biometric components 1056, motion components 1058, environmental components 1060, and/or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 1062 may include location sensor components (e.g., a GPS receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 and/or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine and/or any of a wide variety of peripheral devices (e.g., a peripheral device coupled via a USB).

Moreover, the communication components 1064 may detect identifiers and/or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 1064 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1025 may be transmitted and/or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1025 may be transmitted and/or received using a transmission medium via the coupling 1072 (e.g., a peer-to-peer coupling) to devices 1070. The term "transmission medium" shall be taken to include any intangible medium that is capable of storing, encoding, or carrying instructions 1025 for execution by the machine 1000, and includes digital or analog communications signals or other intangible medium to facilitate communication of such software.

Furthermore, the machine-readable medium 1047 is non-transitory (in other words, not having any transitory signals) in that it does not embody a propagating signal. However, labeling the machine-readable medium 1047 as "non-transitory" should not be construed to mean that the medium is incapable of movement, the medium should be considered as being transportable from one physical location to another. Additionally, since the machine-readable medium 1047 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving movement path data from a client device, the movement path data comprising location data and speed data, the location data identifying a current location of the client device, and the speed data indicating a rate of travel of the client device;
   identifying a mode of transportation of the client device based on the movement path data;
   determining a predicted travel route of the client device based on the mode of transportation, the movement path data, and at least one obstacle;
   identifying a plurality of geo-fences based on the predicted travel route of the client device, each geo-fence among the plurality of geo-fences comprising geo-fence data that defines notification ranges of each of the plurality of geo-fences;
   calculating a time to reach of the client device to each of the plurality of geo-fences, the time to reach indicating an arrival time to each of the plurality of geo-fences;
   ranking the plurality of geo-fences based on the time to reach of the client device to each geo-fence of the plurality of geo-fences;
   detecting the client device is within a notification range of a geo-fence from among the plurality of geo-fences; and
   causing presentation of a notification at the client device in response to the detecting the client device is within the notification range of the geo-fence.

2. The method of claim 1, wherein the method further comprises selecting a portion of the plurality of geo-fences based on the ranking of the plurality of geo-fences.

3. The method of claim 2, wherein the calculating the time to reach of the client device to each of the plurality of geo-fences is based on the movement path data of the client device.

4. The method of claim 1, wherein the notification includes a presentation of the geo-fence data associated with the geo-fence from a memory of the client device.

5. The method of claim 1, wherein the method further comprises:
accessing a user profile associated with the client device, wherein the user profile includes a set of user preferences, the user preferences defining at least a temporal value.

6. The method of claim 1, wherein causing presentation of the notification is delayed based on the predicted travel route.

7. A non-transitory computer-readable storage medium storing instructions that, when executed by one or more processors of a machine, cause the machine to perform operations comprising:
receiving movement path data from a client device, the movement path data comprising location data and speed data, the location data identifying a current location of the client device, and the speed data indicating a rate of travel of the client device;
identifying a mode of transportation of the client device based on the movement path data;
determining a predicted travel route of the client device based on the mode of transportation, the movement path data, and at least one obstacle;
identifying a plurality of geo-fences based on the predicted travel route of the client device, each geo-fence among the plurality of geo-fences comprising geo-fence data that defines notification ranges of each of the plurality of geo-fences;
calculating a time to reach of the client device to each of the plurality of geo-fences, the time to reach indicating an arrival time to each of the plurality of geo-fences;
ranking the plurality of geo-fences based on the time to reach of the client device to each geo-fence of the plurality of geo-fences;
detecting the client device is within a notification range of a geo-fence from among the plurality of geo-fences; and
causing presentation of a notification at the client device in response to the detecting the client device within the notification range of the geo-fence.

8. The non-transitory computer-readable storage medium of claim 7, wherein the instructions cause the machine to perform operations further comprising selecting a portion of the plurality of geo-fences based on the ranking of the plurality of geo-fences.

9. The non-transitory computer-readable storage medium of claim 8, wherein the calculating the time to reach of the client device to each of the plurality of geo-fences is based on the movement path data of the client device.

10. The non-transitory computer-readable storage medium of claim 7, wherein the notification includes a presentation of the geo-fence data associated with the geo-fence from memory of the client device.

11. The non-transitory computer-readable storage medium of claim 7, wherein the instructions cause the machine to perform operations further comprising:
accessing a user profile associated with the client device, wherein the user profile includes a set of user preferences, the user preferences defining at least a temporal value.

12. A system comprising:
a memory; and
at least one hardware processor coupled to the memory and comprising instructions that causes the system to perform operations comprising:
receiving movement path data from a client device, the movement path data comprising location data and speed data, the location data identifying a current location of the client device, and the speed data indicating a rate of travel of the client device;
identifying a mode of transportation of the client device based on the movement path data;
determining a predicted travel route of the client device based on the mode of transportation, the movement path data, and at least one obstacle;
identifying a plurality of geo-fences based on the predicted travel route of the client device, each geo-fence among the plurality of geo-fences comprising geo-fence data that defines notification ranges of each of the plurality of geo-fences;
calculating a time to reach of the client device to each of the plurality of geo-fences, the time to reach indicating an arrival time to each of the plurality of geo-fences;
ranking the plurality of geo-fences based on the time to reach of the client device to each geo-fence of the plurality of geo-fences;
detecting the client device is within a notification range of a geo-fence from among the plurality of geo-fences; and
causing presentation of a notification at the client device in response to the detecting the client device within the notification range of the geo-fence.

13. The system of claim 12, wherein the instructions cause the system to perform operations further comprising selecting a portion of the plurality of geo-fences based on the ranking of the plurality of geo-fences.

14. The system of claim 13, wherein the calculating the time to reach of the client device to each of the plurality of geo-fences is based on the movement path data of the client device.

15. The system of claim 12, wherein the notification includes a presentation of the geo-fence data associated with the geo-fence from the client device.

* * * * *